US012754884B2

(12) United States Patent
Wang et al.

(10) Patent No.: US 12,754,884 B2
(45) **Date of Patent: *Oct. 6, 2026**

(54) METHOD, APPARATUS, ELECTRONIC DEVICE AND STORAGE MEDIUM FOR INFORMATION PROCESSING

(71) Applicant: Beijing Zitiao Network Technology Co., Ltd., Beijing (CN)

(72) Inventors: Changming Wang, Beijing (CN); Fan Yang, Beijing (CN); Linna Zhang, Beijing (CN); Bingxi Lin, Beijing (CN); Changyu Guo, Beijing (CN); Fang Liu, Beijing (CN); Zisheng Liu, Beijing (CN); Tian Lan, Beijing (CN); Fabin Liu, Beijing (CN); Zhengzhe Zhang, Beijing (CN); Siyu Hou, Beijing (CN); Yao Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,926

(22) Filed: Dec. 27, 2023

(65) Prior Publication Data

US 2024/0126724 A1 Apr. 18, 2024

Related U.S. Application Data

(63) Continuation of application No. PCT/CN2022/113092, filed on Aug. 17, 2022.

(30) Foreign Application Priority Data

Aug. 18, 2021 (CN) ........................ 202110950234.2
Sep. 7, 2021 (CN) ........................ 202111046201.1

(51) Int. Cl.
*G06F 16/182* (2019.01)
*G06F 16/11* (2019.01)
(Continued)

(52) U.S. Cl.
CPC ........ *G06F 16/1827* (2019.01); *G06F 16/113* (2019.01); *G06F 16/13* (2019.01);
(Continued)

(58) Field of Classification Search
CPC ........ G06Q 10/10; G06Q 10/06; G06F 16/93; G06F 16/9558; G06F 16/183;
(Continued)

(56) References Cited

U.S. PATENT DOCUMENTS 5,890,163 A * 3/1999 Todd ........................ G06F 16/10
6,070,177 A 5/2000 Kao et al.
(Continued)

FOREIGN PATENT DOCUMENTS

CN 101004804 A 7/2007
CN 101622601 A 1/2010
(Continued)

OTHER PUBLICATIONS

Gazze et al, "WorkMail: Collaborative Document Workflow Management by Email", publisher: Springer-Verlag Berlin Heidelberg, published: 2012, pp. 14-23 (Year: 2012).*
(Continued)

*Primary Examiner* — Wilson W Tsui
(74) *Attorney, Agent, or Firm* — BakerHostetler

(57) ABSTRACT

The disclosure relates to the field of computers, and particularly to a method, apparatus, electronic device and storage medium for information processing. The method of information processing provided in the present disclosure includes: at a time before the end of a service processing flow about a first file, determining a save strategy for the first
(Continued)

file in response to a user operation, so that the first file is saved based on the save strategy after the end of the service processing flow.

14 Claims, 12 Drawing Sheets

(51) Int. Cl.

| | |
|---|---|
| ***G06F 16/13*** | (2019.01) |
| ***G06F 16/93*** | (2019.01) |
| ***G06F 16/955*** | (2019.01) |
| ***G06F 21/60*** | (2013.01) |
| ***G06F 21/62*** | (2013.01) |
| ***G06F 40/106*** | (2020.01) |
| ***G06F 40/123*** | (2020.01) |
| ***G06Q 10/10*** | (2023.01) |
| ***H04L 67/06*** | (2022.01) |

(52) U.S. Cl.
CPC ............ *G06F 16/183* (2019.01); *G06F 16/93* (2019.01); *G06F 16/9558* (2019.01); *G06F 21/604* (2013.01); *G06F 21/6209* (2013.01); *G06F 40/106* (2020.01); *G06F 40/123* (2020.01); *G06Q 10/10* (2013.01); *H04L 67/06* (2013.01); *G06F 2221/2141* (2013.01)

(58) Field of Classification Search
CPC .... G06F 16/13; G06F 16/1827; G06F 16/113; G06F 40/123; G06F 40/106; G06F 21/604; G06F 21/6209; H04L 67/06
See application file for complete search history.

(56) References Cited

U.S. PATENT DOCUMENTS

| | | | | |
|---|---|---|---|---|
| 6,370,552 | B1 | 4/2002 | Bloomfield | |
| 6,678,705 | B1 | 1/2004 | Berchtold et al. | |
| 7,065,493 | B1 | 6/2006 | Homsi | |
| 7,391,423 | B1 | 6/2008 | Manzari et al. | |
| 8,122,364 | B2 | 2/2012 | Yozell-Epstein | |
| 8,266,544 | B1 | 9/2012 | Kay | |
| 8,682,989 | B2 | 3/2014 | Meisels | |
| 8,805,741 | B2 | 8/2014 | Laverdiere-Papineau et al. | |
| 8,893,036 | B1 | 11/2014 | Wabyick | |
| 10,552,796 | B1 | 2/2020 | Delacort et al. | |
| 11,216,172 | B1 | 1/2022 | Hart et al. | |
| 2001/0011364 | A1 | 8/2001 | Stoub | |
| 2001/0034843 | A1 | 10/2001 | Hess | |
| 2003/0028404 | A1 | 2/2003 | Herron et al. | |
| 2003/0061266 | A1 | 3/2003 | Ouchi | |
| 2004/0148214 | A1 | 7/2004 | Aziz et al. | |
| 2004/0243925 | A1* | 12/2004 | Yates | G06Q 10/10 715/255 |
| 2005/0097061 | A1 | 5/2005 | Shapiro et al. | |
| 2005/0228836 | A1 | 10/2005 | Bacastow | |
| 2006/0010025 | A1* | 1/2006 | Sattler | G06Q 10/06316 705/7.18 |
| 2006/0069605 | A1 | 3/2006 | Hatoun | |
| 2006/0074714 | A1* | 4/2006 | Aziz | G16H 40/20 705/2 |
| 2006/0085452 | A1 | 4/2006 | Cope | |
| 2006/0149725 | A1 | 7/2006 | Ritter | |
| 2006/0288222 | A1* | 12/2006 | Dunkley | H04L 9/3247 713/180 |
| 2007/0088958 | A1 | 4/2007 | Qa | |
| 2007/0192275 | A1* | 8/2007 | Foygel | G06F 16/93 |
| 2008/0046518 | A1* | 2/2008 | Tonnison | G06Q 10/107 709/227 |
| 2009/0006936 | A1 | 1/2009 | Parker et al. | |
| 2009/0006949 | A1 | 1/2009 | Takeuchi | |
| 2009/0260060 | A1* | 10/2009 | Smith | H04L 63/105 715/753 |
| 2009/0300471 | A1 | 12/2009 | Dettinger | |
| 2011/0145037 | A1 | 6/2011 | Domashchenko et al. | |
| 2012/0060162 | A1 | 3/2012 | Hunt et al. | |
| 2012/0110087 | A1 | 5/2012 | Culver | |
| 2013/0201534 | A1 | 8/2013 | Carlen et al. | |
| 2013/0283145 | A1 | 10/2013 | Argent | |
| 2014/0033118 | A1 | 1/2014 | Baird | |
| 2014/0201131 | A1 | 7/2014 | Burman | |
| 2015/0100503 | A1 | 4/2015 | Lobo et al. | |
| 2015/0199307 | A1 | 7/2015 | Zhang | |
| 2015/0229648 | A1 | 8/2015 | Avery et al. | |
| 2015/0281149 | A1 | 10/2015 | Masterson et al. | |
| 2016/0026676 | A1 | 1/2016 | Qi et al. | |
| 2016/0117303 | A1 | 4/2016 | Topness et al. | |
| 2016/0127609 | A1 | 5/2016 | Moritani et al. | |
| 2017/0076101 | A1 | 3/2017 | Kochhar et al. | |
| 2017/0131944 | A1* | 5/2017 | Bruckner | G06F 16/93 |
| 2017/0220546 | A1 | 8/2017 | Codrington et al. | |
| 2017/0257406 | A1 | 9/2017 | Wilde et al. | |
| 2018/0246734 | A1 | 8/2018 | Shao et al. | |
| 2018/0300304 | A1* | 10/2018 | Mullins | G06Q 10/10 |
| 2019/0087763 | A1 | 3/2019 | Stone | |
| 2020/0019715 | A1 | 1/2020 | Malliah | |
| 2020/0210383 | A1 | 7/2020 | Demaris et al. | |
| 2020/0380171 | A1 | 12/2020 | Bonat et al. | |
| 2021/0064262 | A1 | 3/2021 | Myers et al. | |
| 2022/0138161 | A1 | 5/2022 | Anjum | |
| 2022/0138690 | A1 | 5/2022 | Anjum | |
| 2022/0405409 | A1 | 12/2022 | Cheng-Shorland et al. | |
| 2022/0414326 | A1 | 12/2022 | Li et al. | |

FOREIGN PATENT DOCUMENTS

| | | | |
|---|---|---|---|
| CN | 102831505 | A | 12/2012 |
| CN | 103218121 | A | 7/2013 |
| CN | 103246595 | A | 8/2013 |
| CN | 103294794 | A | 9/2013 |
| CN | 104571804 | A | 4/2015 |
| CN | 106202568 | A | 12/2016 |
| CN | 107122171 | A | 9/2017 |
| CN | 107886306 | A | 4/2018 |
| CN | 109299037 | A | 2/2019 |
| CN | 109325158 | A | 2/2019 |
| CN | 109408112 | A | 3/2019 |
| CN | 109510754 | A | 3/2019 |
| CN | 110162758 | A | 8/2019 |
| CN | 110221904 | A | 9/2019 |
| CN | 110262965 | A | 9/2019 |
| CN | 110413971 | A | 11/2019 |
| CN | 110752984 | A | 2/2020 |
| CN | 111045999 | A | 4/2020 |
| CN | 111212300 | A | 5/2020 |
| CN | 112035861 | A | 12/2020 |
| CN | 112036824 | A | 12/2020 |
| CN | 112114734 | A | 12/2020 |
| CN | 112183045 | A | 1/2021 |
| CN | 112184158 | A | 1/2021 |
| CN | 112330299 | A | 2/2021 |
| CN | 112367403 | A | 2/2021 |
| CN | 112506854 | A | 3/2021 |
| CN | 112632942 | A | 4/2021 |
| CN | 112668297 | A | 4/2021 |
| CN | 112685091 | A | 4/2021 |
| CN | 112866095 | A | 5/2021 |
| CN | 113128185 | A | 7/2021 |
| CN | 113191517 | A | 7/2021 |
| CN | 114331331 | A | 4/2022 |
| FR | 2980288 | A1 | 3/2013 |
| JP | 2012-059086 | A | 3/2012 |
| JP | 2017-182329 | A | 10/2017 |
| TW | 201109983 | A | 3/2011 |

OTHER PUBLICATIONS

International Patent Application No. PCT/CN2022/113092; Int'l Search Report; dated Nov. 17, 2022; 3 pages.
International Patent Application No. PCT/CN2022/113091; Int'l Search Report; dated Nov. 18, 2022; one page.

(56) References Cited

OTHER PUBLICATIONS

"How to upload wps cloud documents to private space"; https://jingyan.baidu.com/article/fb48e8be0dea676e622e1407.html; Baidu; Jul. 2016; accessed Dec. 28, 2023; 10 pages.
Y. Chunbao; "Flexible use of Microsoft word"; Computer Application; 46 No. 3; Mar. 2006; p. 105 (contains English Translation).
International Patent Application No. PCT/CN2022/113095; Int'l Search Report; dated Nov. 17, 2022; 2 pages.
International Patent Application No. PCT/CN2022/113093; Int'l Search Report; dated Nov. 18, 2022; 3 pages.
International Patent Application No. PCT/CN2022/113097; Int'l Search Report; dated Oct. 25, 2022; 2 pages.
U.S. Appl. No. 18/397,951; Non-Final Office Action; dated Apr. 29, 2024; 44 pages.
U.S. Appl. No. 18/397,277; Non-Final Office Action; dated Mar. 29, 2024; 45 pages.
ErikJamp; "Shade windows in OpenTTD"; TT-Forums.net; May 2009; 6 pages.
Bellotti et al.; "Taking Email to Task: The Design and Evaluation of a Task Management Centered Email Tool"; CHI; vol. 5 Issue No. 1; Apr. 2003; p. 345-352.
U.S. Appl. No. 18/396,647; Non-Final Office Action; dated Feb. 29, 2024; 40 pages.
Chumakova; "How to Transform your Outlook into a Workflow System"; https://www.cmwlab.com/blog/how-to-transform-your-outlook-into-a-workflow-system/; CMW Lab; Jan. 2015; 4 pages.
U.S. Appl. No. 18/359,616; Non-Final Office Action; dated Mar. 15, 2024; 42 pages.
"Resizing a div to fit content with maximum height"; StackOverflow; May 2012; one page.
U.S. Appl. No. 18/396,647; Non-Final Office Action; dated Oct. 24, 2024; 25 pages.
U.S. Appl. No. 18/539,616; Non-Final Office Action; dated Oct. 24, 2024; 24 pages.
U.S. Appl. No. 18/397,277; Final Office Action; dated Aug. 19, 2024; 30 pages.
U.S. Appl. No. 18/539,616; Final Office Action; dated Jul. 26, 2024; 25 pages.
European Patent Application No. 22857861.3; Extended Search Report; dated Aug. 12, 2024; 9 pages.
Japan Patent Application No. 2023-580867; Notice of Reasons for Refusal; dated Dec. 11, 2024; 8 pages.
U.S. Appl. No. 18/397,277; Non-Final Office Action; dated Nov. 27, 2024; 30 pages.
U.S. Appl. No. 18/396,647; Final Office Action; dated Mar. 27, 2025; 33 pages.
U.S. Appl. No. 18/396,647; Non-Final Office Action mailed on Jul. 30, 2025, 32 pages.
U.S. Appl. No. 18/397,951; Final Office Action mailed on May 9, 2025, 63 pages.
U.S. Appl. No. 18/539,616; Final Office Action mailed on May 29, 2025, 28 pages.
U.S. Appl. No. 18/397,277; Final Office Action mailed on Jun. 3, 2025, 31 pages.
U.S. Appl. No. 18/397,277; Non-Final Office Action mailed on Sep. 18, 2025, 37 pages.
U.S. Appl. No. 18/397,951; Non-Final Office Action mailed on Sep. 30, 2025, 44 pages.
China Patent Application No. 202111046169.7; Office Action; dated Dec. 4, 2025; 18 pages.
China Patent Application No. 202111046201.1; Office Action; dated Dec. 10, 2025, 14 pages.
U.S. Appl. No. 18/397,951; Final Office Action; dated Feb. 19, 2026; 47 pages.
China Patent Application No. 202111046162.5; Office Action; dated Feb. 12, 2026; 26 pages.
China Patent Application No. 202111046163.X; Office Action; dated Feb. 14, 2026; 11 pages.
China Patent Application No. 202111046202.6; Office Action; dated Mar. 31, 2026; 18 pages.
China Patent Application No. 202111046162.5; Second Office Action; dated Jul. 2, 2026; 28 pages.
Tang Chengjie; "Collection of Papers on Land Resources Monitoring and Survey Engineering"; National Land Resources Survey II; Geological Publishing House; Sep. 2004; p. 275.
Niu Shaozhang; "Information Security Conspectus"; Beijing University of Posts and Telecommunications; Chapter 5 Access Control; APr. 2004; p. 125.

* cited by examiner

METHOD, APPARATUS, ELECTRONIC DEVICE AND STORAGE MEDIUM FOR INFORMATION PROCESSING

CROSS REFERENCE

This disclosure is a continuation of International Patent Application No. PCT/CN2022/113092, filed on Aug. 17, 2022, which claims the priorities of Chinese patent application No. 202110950234.2 filed on Aug. 18, 2021, entitled "method, apparatus, terminal and storage medium for information processing", and Chinese patent application No. 202111046201.1 filed on Sep. 7, 2021, entitled "method, apparatus, electronic device and storage medium for information processing". The above patent applications are incorporated herein by reference in their entireties.

FIELD

The present disclosure relates to the field of computers, particularly to a method, apparatus, electronic device and storage medium for information processing.

BACKGROUND

In some file processing scenarios (for example, enterprise approval scenarios), approval types such as official documents, systems, qualification reviews, and contracts often rely on different information or file content as the bases for decision-making. How to save these files later is a problem that needs to be solved.

SUMMARY

The invention content section is provided to briefly introduce the concepts, which will be described in detail in the following detailed description section. The invention content section is not intended to identify the key features or necessary features of the claimed technical solutions, nor is it intended to limit the scope of the claimed technical solutions.

In a first aspect, according to one or more embodiments of the present disclosure, there is provided a method of information processing, the method comprising:

at a time before the end of a service processing flow about a first file, determining a save strategy for the first file in response to a user operation, so that the first file is saved based on the save strategy after the end of the service processing flow.

In a second aspect, according to one or more embodiments of the present disclosure, there is provided a method of information processing, comprising:

determining a second file associated with a first application, the second file comprising a non-online file;

converting the second file into a first online file or adding the second file to the first online file;

determining a file save strategy associated with the first application, the file save strategy comprising online save address information; and saving the first online file to an online save address indicated by the file save strategy.

In a third aspect, according to one or more embodiments of the present disclosure, there is provided an apparatus for information processing, comprising:

a determination unit configured for, at a time before the end of a service processing flow about a first file, determining a save strategy for the first file in response to a user operation, so that the first file is saved based on the save strategy after the end of the service processing flow.

Fourth aspect, according to one or more embodiments of the present disclosure, there is provided an apparatus for information processing, comprising:

a first file determination unit configured to determine a second file associated with a first application, the second file comprising a non-online file;

a first online file conversion unit configured to convert the second file into a first online file or adding the second file to the first online file;

a file save strategy unit configured to determine a file save strategy associated with the first application, the file save strategy comprising online save address information; and a first online file save unit configured to save the first online file to an online save address indicated by the file save strategy.

In a fifth aspect, according to one or more embodiments of the present disclosure, there is provided an electronic device, comprising: at least one memory and at least one processor; wherein the memory is configured to store program code, and the processor is configured to call the program code stored in the memory to cause the electronic device to perform a method of information processing according to one or more embodiments of the present disclosure.

In a sixth aspect, according to one or more embodiments of the present disclosure, there is provided a non-transitory computer storage medium, the non-transitory computer storage medium stores program code that, when executed by a computer device, causes the computer device to perform a method of information processing according to one or more embodiments of the present disclosure.

According to one or more embodiments of the present disclosure, by determining the save strategy of the first file based on the user operation at a time before the end of the service processing flow of the first file, the first file may be processed during the service processing flow automatically and be saved based on a predefined save strategy. As a result, the file related to the service processing flow can be archived efficiently and conveniently, improving file processing efficiency.

According to one or more embodiments of the present disclosure, by determining a second file associated with a first application, the second file comprising a non-online file, the second file includes a non-online file, converting the second file into a first online file or adding the second file to the first online file, determining a file save strategy associated with the first application, the file save strategy comprising online save address information, and saving the first online file to an online save address indicated by the file save strategy, may automatically convert the non-online file into an online file, or add it to the online file, and then archived to the online storage space, thereby achieving automatic online archive of attachments, facilitating application non-online file archive, improving archive efficiency, and saving local storage space.

BRIEF DESCRIPTION OF THE DRAWINGS

In conjunction with the accompanying drawings and with reference to the following detailed description, the above and other features, advantages and aspects of the various embodiments of the present disclosure will become more apparent. Throughout the drawings, like or similar reference numerals denote like or similar elements. It should be understood that the drawings are illustrative, and that elements and elements are not necessarily drawn to scale.

DETAILED DESCRIPTION

Figure 1:
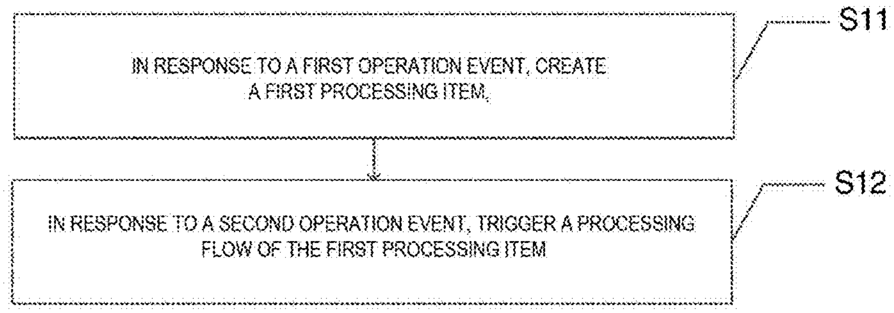
FIG. 1 is a flowchart of a method of information processing according to embodiments of the present disclosure.

The following embodiments of the present disclosure will be described in more detail with reference to the accompanying drawings. Although certain embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the drawings and embodiments of the present disclosure are for illustrative purposes only and are not intended to limit the scope of the present disclosure.

It should be understood that the various steps described in the method implementation method of this disclosure can be executed in parallel. In addition, the method implementation method can include additional steps and/or omit the steps shown. The scope of this disclosure is not limited in this regard.

The term "including" and its variations used in this article are open-ended, i.e. "including but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description. The term "in response to" and related terms refer to a signal or event being affected to some extent by another signal or event, but not necessarily completely or directly affected. If event x occurs "in response to" event y, then x may directly or indirectly respond to y. For example, the appearance of y may ultimately lead to the appearance of x, but there may be other intermediate events and/or conditions. In other cases, y may not necessarily lead to the appearance of x, and even if y has not yet occurred, x may still occur. In addition, the term "in response to" may also mean "at least partially in response to".

The term "determine" encompasses a wide variety of actions, including obtaining, calculating, processing, deriving, investigating, searching (e.g., searching in a table, database, or other data structure), probing, and similar actions, as well as receiving (e.g., receiving information), accessing (e.g., accessing data in memory), and similar actions, as well as parsing, selecting, selecting, establishing, and similar actions, etc. Relevant definitions of other terms will be given in the following description. Relevant definitions of other terms will be given in the following description.

It should be noted that the concepts of "first" and "second" mentioned in this disclosure are only used to distinguish different devices, modules, or units, and are not used to limit the order or interdependence of the functions performed by these devices, modules, or units.

It should be noted that the modification of "one" mentioned in this disclosure is illustrative and not restrictive. Those skilled in the art should understand it as "one or more" unless otherwise specified in the context.

For purposes of this disclosure, the phrases "A and/or B" mean (A), (B), or (A and B).

The form of the online document disclosed in this disclosure is not limited, for example, it can be a text document, a table document, a multimedia document, etc. The application includes a series of instructions and/or data collections running on electronic devices such as personal computers (PCs), mobile terminals, virtual reality (VR) devices, and enhanced display (AR) devices, which are used to provide specific services or perform predetermined data processing.

The names of messages or information exchanged between multiple devices in the present disclosure are for illustrative purposes only and are not intended to limit the scope of such messages or information.

Hereinafter, in conjunction with the accompanying drawings, the embodiments of the present disclosure will be described in detail.

The present disclosure provides a method of information processing, comprising:

determining a first application, the first application is associated with the first service logic, and the first application processes the service data of the first application according to the first service logic;

establishing an association between the first application and the first online document;

performing first processing on service data of the first online document based on information related to the service processing node of the first application.

By processing the data of the first online document according to the information related to the service processing node of the first application, the data processing of the first online document can adapt to the service logic of the first application itself, so that the data carried by the online document can reflect or adapt to the service logic. On the one hand, when using the first application for service processing, the convenience of online collaboration and the like of online documents can be utilized, and on the other hand, it can prevent the service logic from being destroyed, e.g., due to the collaboration openness of online documents and the like, thereby improving the reliability of services.

In some embodiments, the first application may have a variety of presentation forms, such as standalone applications, or embedded or based on subroutines in other programs, applet and the like.

Establishing an association with the first online document in the first application may include linking or displaying the first online document in a processing interface of the first application.

In some embodiments, the information related to the service processing node includes at least one of the following: the service node, personal information associated with the service node, and service data associated with the service node.

Performing first processing on the data of the first online document according to information related to the service processing node of the first application comprises one or more of the following:

according to the current service processing node, processing the display information, permission information, and content data carried internally of the first online document.

according to the personal information associated with the service node, processing the displayable content, display format, and permission information of the first online document for the person;

generating the first online document or processing the content data carried in the first online document according to the service data associated with the service node.

In some embodiments, the first application may be an approval application, the information related to the service processing node includes more than one approval node, the person associated with the approval node, such as the approver, person to be copied, bill of lading person (request approval person) and so o.

In some embodiments of the present disclosure, the first application may be a reporting program, and the related information of the service node includes more than one reporting node and the reporting node associated person such as persons who are reported to, the persons who are copied, and the like.

Within the enterprise, sometimes it is necessary to approve project content, work content, product qualifications, and rules and regulations. Usually, the processing process is triggered first, and then approval tasks are created. Approval tasks usually need to be approved by multiple responsible persons.

Taking the approval process as an example, this public plan is introduced as an example: sometimes within the enterprise, it is necessary to approve some matters, such as approving documents, systems, qualifications, contracts, etc. During the approval process, it is sometimes necessary to consult relevant documents as a reference.

As shown in FIG. 1, FIG. 1 is a flow diagram of the embodiments of the present disclosure method of information processing, comprising the following steps.

S11: in response to a first operation event, create a first processing item.

In some embodiments, the information processing method can be used for a first application such as an approval program and can create the first processing item (the first processing item can be service data) in the first application. The first operation event, for example, may include one or more operations, such as a first processing item creation operation, which can be a first operation event performed by the creator of the first processing item. The first processing item can be document approval, leave approval, system approval, decision approval, etc. The first processing item has a first online document (also known as a cloud document), which can be stored in a cloud space, for example, it can be stored in a server. The first online document can be a document created by the creator of the first processing item. First processing item can be displayed in the form of task items, in which a document display area can be inserted, displayed in the document display area.

S12: in response to a second operation event, trigger a processing flow of the first processing item.

In some embodiments, the second operation event may include one or more operation steps, the second operation event may be, for example, an event to submit first processing item, after triggering the second operation event, the start of the first processing item processing flow (service processing flow), may be executed according to a first service logic starts service processing logic.

In some embodiments of the present disclosure, it is possible to create first processing item having a first online document. For a person for review, the first online document can be viewed in the first processing item. For example, the first online document may be associated information of first processing item documents, so as to facilitate handler to review the associated information when approving.

In some embodiments of the present disclosure, in response to the first operation event, before creating the first processing item, the method further comprises: in response to a process creation operation, setting document permission of the service processing node of the processing flow and the handler of the service processing node. In some embodiments, the processing flow of processing item may include one or more service processing nodes, and the service processing node may have a corresponding handler, and document permission can be set for the service processing node of first processing item. The document permission of the handler can be permission to view and permission to edit, and the handler's permission for the online documents in the processing item can be determined based on document permission to achieve permission management. In some embodiments, the permission to view and permission to edit for the online documents can be set for the service processing node, thereby specifying which nodes can read or edit the online documents.

Figure 2:
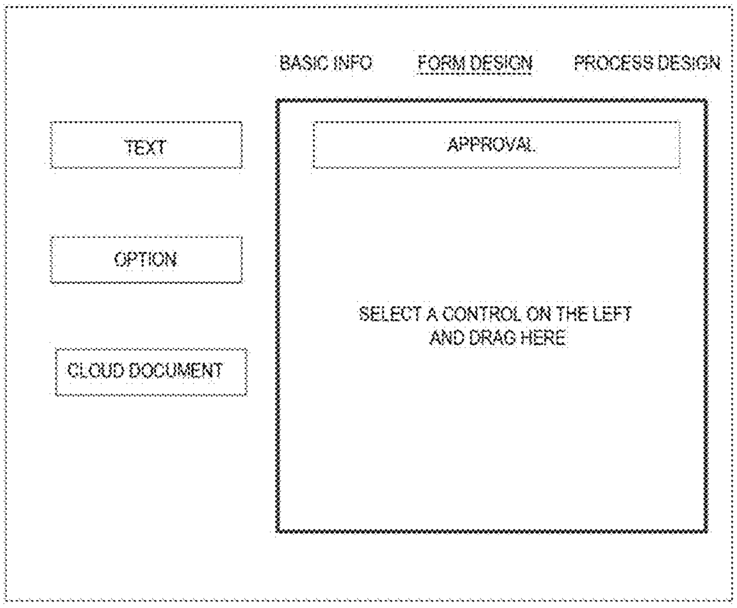
FIG. 2 is a schematic diagram of an item template according to an embodiment of the present disclosure.
Figure 3:
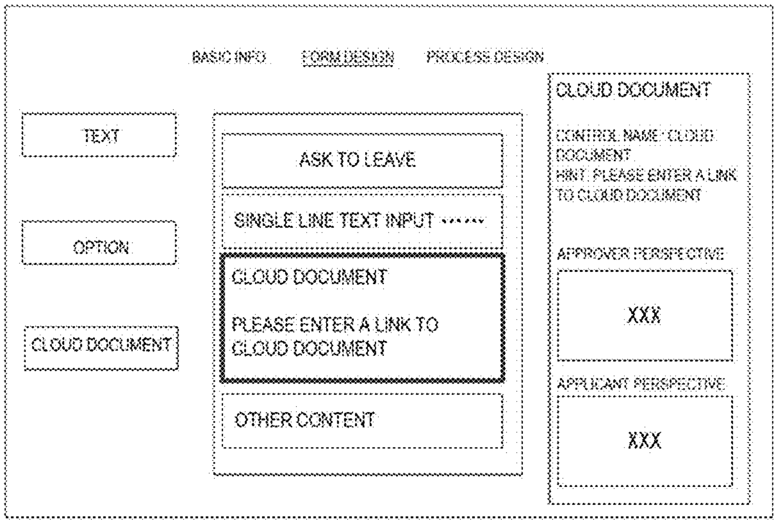
FIG. 3 is a schematic diagram of an item template according to an embodiment of the present disclosure.

In some embodiments of the present disclosure, in response to a first operation event, before creating first processing item, the method further comprises: creating an item template for the processing item, the item template has a control(s) for adding online documents in the first processing item template; the first processing item is established based on the item template. In some embodiments, the item template of the processing item can be a form module, which can be pre-designed to process item templates for creating first processing item. FIG. 2 schematically shows the item template. The item template can have controls for adding online documents (cloud documents), for example, multiple controls can be provided for selection. Referring to FIG. 3, the text control and cloud document control are added, which can be item templates created by the administrator of the approval program. After creating the item template, the creator (applicant) of the first processing item initiates an application and creates first processing item based on the item template and adds the first online document via the control for adding online documents. Of course, in the item template, other controls can be added by triggering the add control option, and a widget name can be entered after adding other controls. For the control used to add online documents, it has a text box, which is used to display the online document. The text box has a default prompt text (such as "Please enter a link to cloud document" in FIG. 3), and the prompt text can be edited. Different languages can be supported for the prompt text. In some embodiments, the first processing item can be output, for example, it can be printed or stored as a specific file. After the first approval document is output, the output content can display the controls included in the first processing item and the content in the controls, that is, the name of the control used to display the online document and the document name of the first online document are output. For example, the name of the control used to add the online document is "cloud document", and the document name of the first online document will be output after the first approval document is output. In some embodiments, after creating an item template of first processing item, it is possible to display a preview of the item template, for example, it is possible to display a preview of the perspective of different users (approver perspective and applicant perspective shown in FIG. 3), to view the implementation effect.

Figure 4:
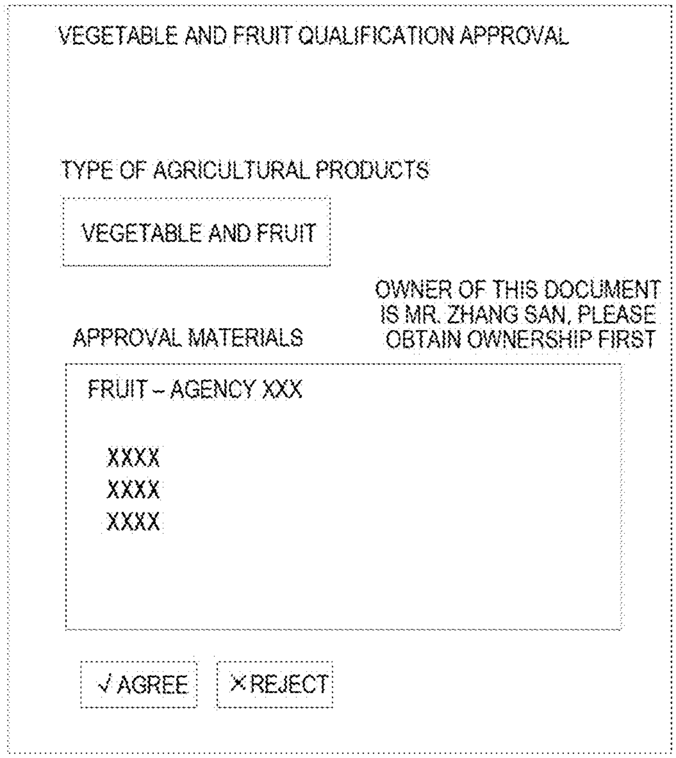
FIG. 4 is a schematic view of display of a first processing item according to an embodiment of the present disclosure.

In some embodiments of the present disclosure, creating first processing item in response to a first operation event comprises: in response to a trigger operation of the processing item creation control, displaying a item creation interface (the item creation interface may be an item creation template), displaying a control for adding an online document in the item creation interface, and displaying a document adding interface in response to a trigger operation of the control for adding an online document. In some embodiments, the document adding interface may display a recommended online document, a search box may be displayed in the document adding interface, and information such as a document title or document address may be entered in the search box to search for online documents, and the current user's permission for the online document may be displayed in an associated area of the searched online document when searching for an online document, and the searched online document may be selectively added. The first online document can be added to the document addition page, and the first online document can be displayed in the document display area of the item creation interface. The associated information of the first operation item can be input in the item creation interface, and the creation of the first operation item can be completed in response to the trigger operation of the determination control of the document creation interface. In some embodiments, only the owner of the first online document can add the first online document to the first operation item, as shown in FIG. 4. If the creator of the first operation item is not the owner of the first online document, a prompt message can be issued when adding the first online document in the first operation item. The prompt message can display the owner of the first online document, such as displaying the communication method or service card of the owner of the first online document, or the control for contacting the owner of the first online document after being triggered can be displayed in the prompt message. This makes it convenient to apply for permission from the owner of the first online document.

Figure 5:
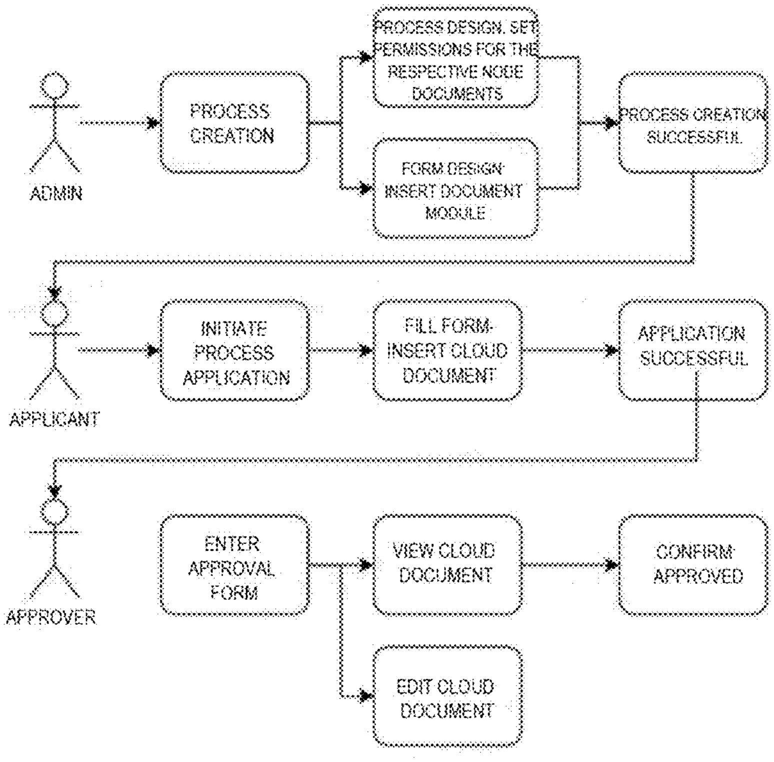
FIG. 5 is a flowchart of an information processing method according to an embodiment of the present disclosure.
Figure 6:
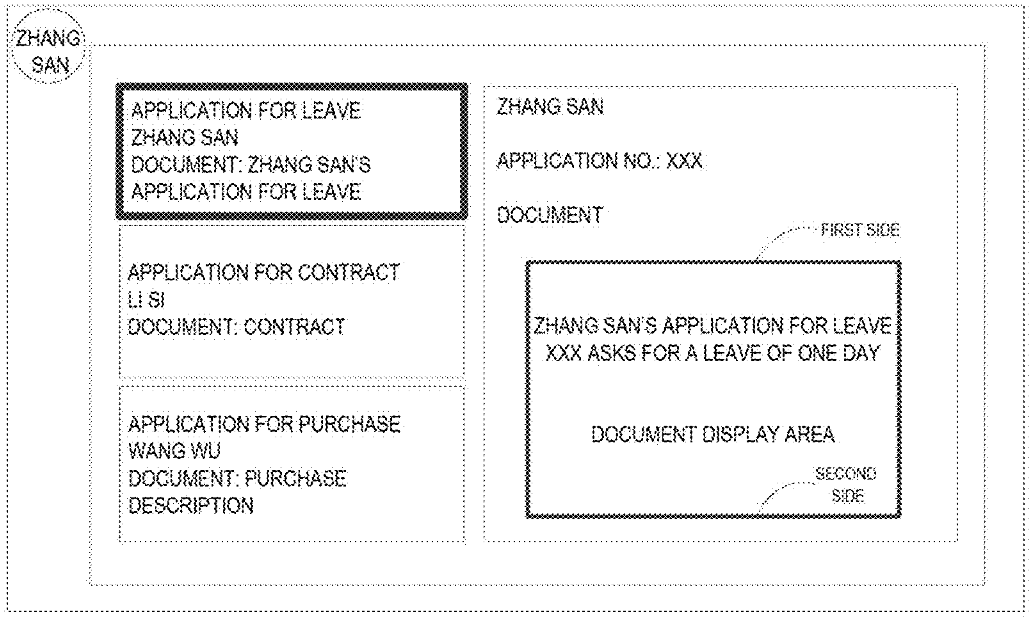
FIG. 6 is a schematic display of a target communication program according to an embodiment of the present disclosure.

In some embodiments, as shown in FIG. 5, the administrator of the first application creates a flow, then designs the flow, sets the document permission of each node, and designs a form to insert a document module (for adding controls for online documents). After the processing flow is successfully created, the applicant initiates a process application, fills in and adds online documents on the basis of the item template, and approves it by the associated person of the service processing node (such as handlers). When approving, it is possible to view and edit cloud documents. After confirming that there are no errors, the approval is passed, and the service processing node flows to the next node.

In some embodiments of the present disclosure, the method further comprises: when creating a item template, determining a save address of the online document in the item template, and saving the online document in the first processing item created based on the item template to the save address. Alternatively, when creating first processing item, it is possible to determine a save address of the first online document and save the first online document to the save address. In some embodiments, a save control can be provided to control whether the online document is saved by the save control. In response to determining that the online document is to be saved, an interface for determining the address to save the online document is provided, and the address selected or entered is used as the address to save the online document. In some embodiments, the save address of the online document, for example, the save address of the first online document, can be a node of the document storage center, with the selected cloud document storage center (referred to as wiki) node as the save address, and providing an option to choose whether to give the owner of the online document (such as the first document) to the wiki owner.

In some embodiments of the present disclosure, the method further comprises: in response to a trigger operation of the handler of the current service processing node of the processing flow on the operation item, viewing the operation item; and in response to the handler on the first processing item of the application, executing the corresponding first processing item according to the processing operation. The handler of the current service processing node can view the first processing item, and when it has the right to read or edit the first online document, it can read or edit the first online document. The handler can process the first processing item, such as agreeing that the first operation item makes the processing flow to the next service processing node, or opposing the first processing item, thereby ending the processing flow.

In some embodiments of the present disclosure, the first processing item is created in a control (e.g., Applet) of the target communication software. In some embodiments, the first application is associated with the target communication software, and the account in the first application and the target communication software are interrelated. The method in the present disclosure can be executed through the control of the target communication software, such as creating first processing item and triggering a processing flow of first processing item.

In some embodiments of the present disclosure, the method further comprises: displaying the first processing item in a control of the target communication software of the handler of the service processing node of the processing flow. In some embodiments, the executor of the method can be a first application such as an approval program, and the first application can communicate with each other and associate with the target communication software. The target communication software can be, for example, even if the communication software, the user account of the first application and the target communication software are associated with each other, and the integration between the two software systems is realized by matching the account program. The handler of the node in the target communication software can process and access the first processing item and the first online document through the target communication software, comment on the first online document with comment permission, read the first online document with permission to view, edit the first online document with permission to edit, and the operations performed by the handler on the target communication software on the first processing item and the operations performed by the processor on the first processing item and the first online document on the target communication software will be synchronized to the first application, so that the user can access the first application or submit materials without the permission of the first application. It is convenient to handle the first processing item without opening the access rights of the first application to the user. Through the target communication software, with the help of the first document's permission diffusion capabilities such as commenting and editing, it allows external users of the first application to complete the first application. Processing or submission of materials within time limits. For example, the control used to display the first processing item can be embedded in the applet of the target communication program, such as embedded in the approval component, reporting component, task and key node component or other components of the target communication software, through the component they can view and process the first processing items and the first online documents. This technical solution can be used in any business scenarios that need to use documents to carry information. FIG. 5 schematically shows the display interface of the first application, which displays a list of processing items. The selected processing items in the list of processing items will be displayed in detail.

Figure 7:
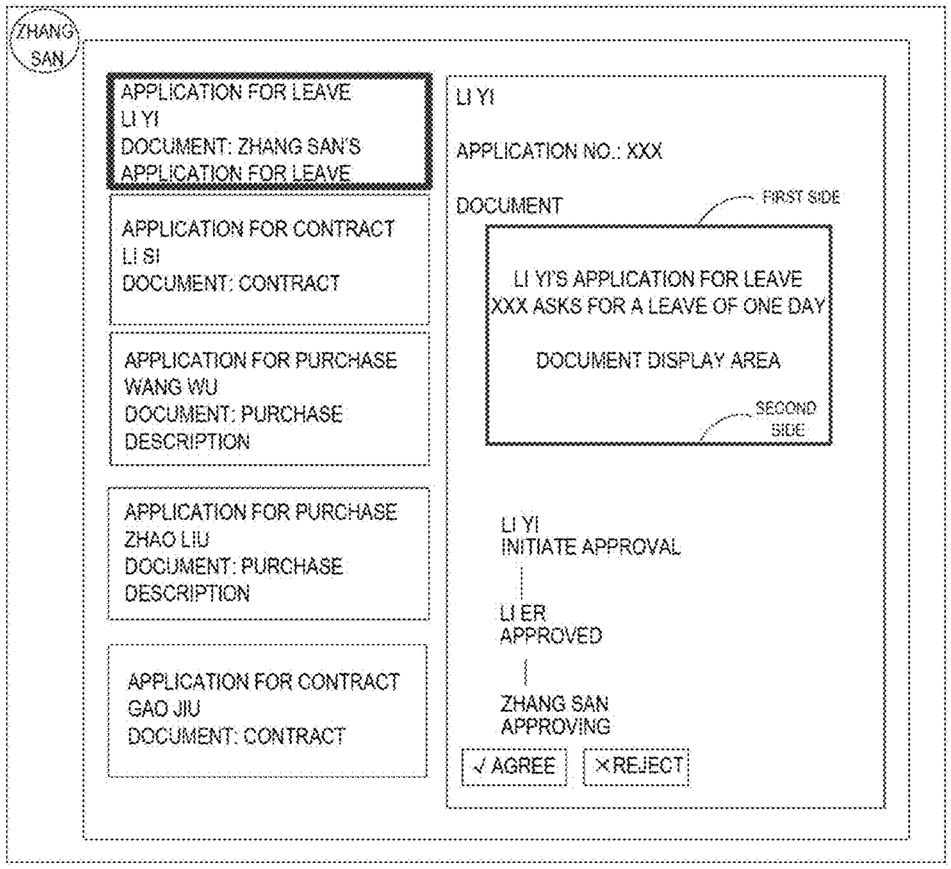
FIG. 7 is a schematic display of a target communication program according to an embodiment of the present disclosure.

In some embodiments of the present disclosure, the target communication software associated person (creator, handler, etc.) of the first operation item displays the entry identifier of the first processing item (items in the processing item list), and after the entry identifier is triggered, the content of the first processing item is displayed, and the entry identifier can display the name of the first online document in the first processing item. As shown in FIG. 7, information related to the service processing flow service processing node can also be displayed, such as the associated person of the service processing node and the processing status of the first processing item.

In some embodiments of the present disclosure, the display interface of the first processing item has a document display area for displaying the first online document, the document display area, the size and/or position of the document display area can be adjusted. In some embodiments of the present disclosure, the internal connection frame can be used as the document display area to display the first online document by setting an internal connection frame in the control displaying the first processing item. The internal connection frame can be an iframe frame, for example, when displaying first processing item in the applet of the target communication software, the internal connection frame can be loaded in the applet to display the first online document in the inline frame. The size of the document display area displaying the first online document can be adjusted, the length and width of the document display area can be adjusted, and the display position of the document display area can be moved freely, thereby improving the user experience.

In some embodiments, the adjustment of the length dimension of the document display area can be realized in the following way. Herein the length dimension can be the display length of the document display area, and the display length can refer to the size in the longitudinal direction of the display interface. In the control for displaying first processing item, a display container is set, the display container can be a view object, and the display container can have an initial length and a maximum length. The internal connection frame is set in the display container, and the length dimension of the document display area can be changed by dragging the edge of the display container. The display container is used as an operation object for dragging, and the display container can be set in the display area of the first operation item, and the height of the z-axis direction in the display area of the first operation item is higher than that of other elements in the display area of the first operation item, so as to prevent the display container from being blocked by other elements, and the length dimension of the display container is not less than the minimum predetermined value.

In some embodiments of the present disclosure, the document display area has an associated operation element, the operation element can be, for example, a display container as described above, which enters a first mode by triggering the operation element. After entering the first mode, the size of the document display area can be adjusted by dragging or in a predetermined way. In some embodiments, after the operation element is triggered, a current first height position (such as the position of a mouse or finger) is recorded. The current first height position can refer to a position in the direction of the length of the document display area. In the first mode, a predetermined operation such as dragging, or sliding can be used to obtain a second height position (such as a height position in the direction of the length of the document display area) at the end of the predetermined operation. A height difference value is determined based on the first height position and the second height position. According to the height difference value and the size of the document display area before the predetermined operation is performed, the size of the document display area is adjusted to obtain and display the adjusted document display area. In some embodiments, the size range of the document display area is set in advance, and if the size of the adjusted document display area is greater than the maximum value of the size range, the size of the document display area is set to the maximum value of the size range. If the size of the adjusted document display area is smaller than the minimum value of the size range, the size of the document display area is set to the minimum value of the size range. A specific embodiment is as below: triggering the start event by clicking on the operation element, entering the drag mode at this time and recording the height position (mouse or finger) in the longitudinal direction of the document display area, holding down the mouse or holding the screen (touch screen) in the drag mode, dragging or sliding triggers the movement adjustment event, performing a difference calculation (negative value exists) of computed height position and the height position recorded when entering the drag mode, and then adding the difference value to the size of the existing document display area to obtain a new size. A threshold verification is made for the obtained new size. If it exceeds the threshold value, stop it at the threshold edge (i.e., maximum or minimum value), then set the size of the document display area, and finally release the mouse (or finger), set the last size in this drag mode in the event and close the drag mode after recording the size of the display area.

Figure 8:
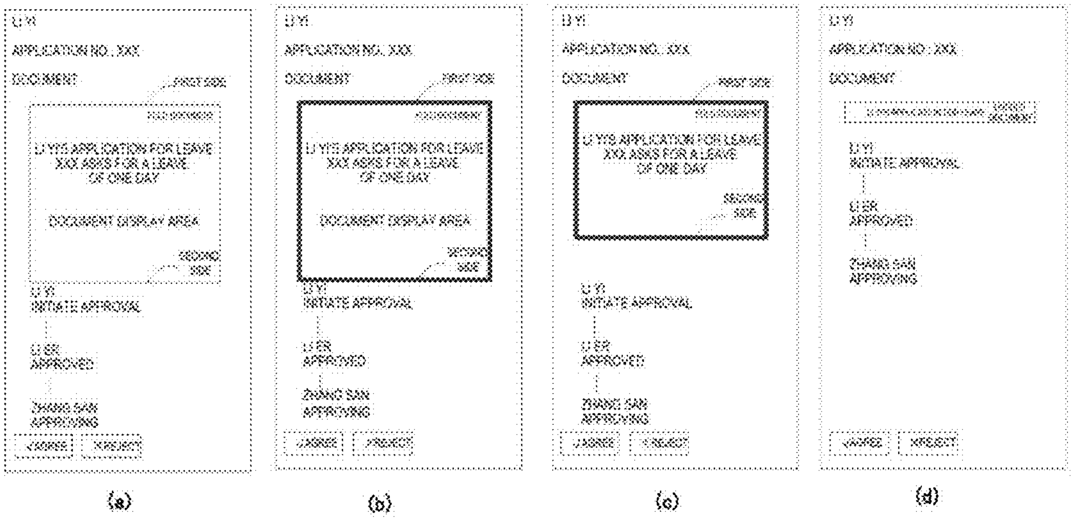
FIG. 8 is a schematic variation of a document display area according to an embodiment of the present disclosure.

In some embodiments of the present disclosure, please refer to FIG. 8 (*a*), the document display area has a first side and a second side, which can be the document display area in the longitudinal direction of the display interface displaying first processing item edge. In response to the selection operation of the document display area, which can be a control identification such as a mouse hovering in the document display area, the display style of the document display area can be changed after selecting the document display area, as shown in FIG. 8 (*b*). In response to the first predetermined operation performed after the document display area is selected, the first side of the document display area is fixed in the display interface position, and the position of the second side in the display interface is changed. For example, the first predetermined operation may be an upward scrolling operation of the mouse, the first side may be the upper edge of the document display area in the longitudinal direction of the display interface, and the second side is the lower edge of the document display area in the longitudinal direction of the display interface. After selecting the document display area, by rotating the mouse shaft, the upper edge can be fixed while the position of the lower edge can be changed, thereby changing the size of the document display, as shown in FIG. 8(*c*). For example, the document display area can be quickly folded by rotating the mouse shaft in a first direction and can be quickly folded by rotating the mouse shaft in a second direction. In some embodiments of the present disclosure, when the distance between the first side and the second side of the document display area is greater than the predetermined distance, if the second predetermined operation is performed, the first side is fixed at the position of the display interface, and the distance between the second side and the first side is reduced. For example, the first side is the upper edge of the document display area, and the second side is the lower edge of the document display area. When the distance between the first side and the second side is large, the user's view of the first operation item will be hindered, so the second predetermined operation can be performed (such as scrolling up the mouse shaft) to fix the first side unchanged while changing the position of the second side to reduce the distance between the first and second sides. This can quickly fold the first online document and solve the problem that the user's view of other information is hindered due to the long document display area. That is, when the document display area is greater than or equal to the default height, the head (first side) of the document display area can be fixed when scrolling up to therefore quickly fold the document. In some embodiments, the distance between the first and second sides of the document should not be smaller than a predetermined distance. In some embodiments, as shown in FIG. 8 (*c*), the document display area displays a folding control. After the folding control is triggered, the document display area is folded, for example, the document display area is hidden. At this time, only the identification of the first online document can be displayed. After the folded document display area, as shown in FIG. 8 (*d*), the expansion identification can be displayed. After the expansion identification is triggered, the document display area is displayed.

In some embodiments of the present disclosure, after the document display area is selected, when the control identification (e.g., a mouse) moves to the edge of the first side or the second side of the document display area may change the style of the control identification, the control identification after changing the style, the control identification can be used to change the position of the first side or the second side, thereby changing the size of the document display area.

In some embodiments of the present disclosure, in the display interface of first processing item, the default size of the document display area of the first online document depends on the content amount of the first online document. When the content amount of the first online document is greater than the content amount threshold, the first default size can be used. When the content amount of the first online document is not greater than the content amount threshold, the second default size is used, and the first default size is greater than the second default size. The document display area can be located in an area below the title of first processing item in the display interface of first processing item.

In some embodiments of the present disclosure, in order to ensure the smoothness of control and meet performance requirements, the size adjustment frequency of the document display area can be limited, and the size adjustment frequency of the document display area per unit time is not higher than the predetermined frequency, such as controlling the frequency threshold of resetting the size per second, and setting whether to refresh the display interface when the frequency exceeds the frequency threshold. For example, when the size adjustment frequency of the document display area exceeds the frequency threshold, the display interface is not refreshed to reduce performance requirements, so that when adjusting the size of the document display area multiple times, the display interface can be refreshed only when the time after adjusting the document display area reaches the predetermined time length and the size adjustment operation of the document display area is no longer detected, thereby saving computing power.

Figure 9:
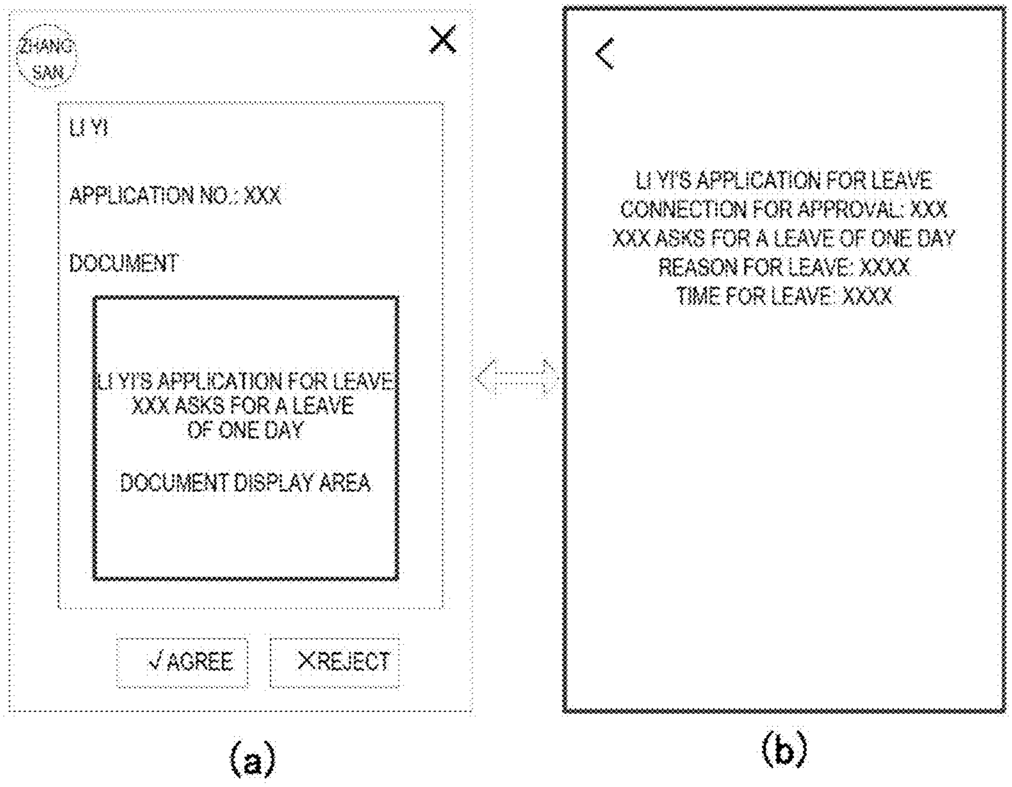
FIG. 9 is a schematic diagram of non-full screen and full screen displays of a first online document in first processing item according to an embodiment of the present disclosure.

In some embodiments of the present disclosure, as shown in FIG. 9 (*a*), while displaying first processing item, after the area where the first online document in the first processing item is triggered, as shown in FIG. 9 (*b*), the first online document can be displayed in full screen. This can meet the browsing needs of mobile devices. When the first online document is displayed in full screen, the first online document can be displayed in full screen, and the first processing item will continue to be displayed after exiting.

In some embodiments, the creator of the first processing item is the owner of the first online document, and the creator needs to give the first online document open permission, so that other users can have reading, editing and other permission to solve the processing problems of different users. In some embodiments, the handler of the node of the processing flow can be added as a collaborator of the first online document, and the node can be given the required or predetermined document permission. In other embodiments, the link sharing function of the first online document can be turned on, and the user who obtains the sharing link of the first online document can be set with predetermined permission (such as permission to view or permission to edit), and a password can be set for the sharing link. In this way, by adding the sharing link of the first online document in the first processing item, other users can obtain predetermined permission when opening the link of the first online document in the first processing item.

In some embodiments of the present disclosure, the creator of the first processing item is the owner of the first online document. After triggering the processing flow of the first processing item, the ownership of the first online document is transferred from the creator of the first processing item to the first application, and the creator can retain the permission to view of the first online document but does not retain the permission to edit for the first online document. When triggering the processing flow of first processing item, the processing permission of the non-current service processing node of the processing flow can be read but cannot be edited. Only the current service processing node may have permission to edit (whether it has permission to edit depends on whether the permission to edit are opened for the handler of the node in advance); after the processing flow of the first processing item is completed, the ownership of the first online document is returned to the creator of the first processing item.

In some embodiments, after the first processing item is initiated, if the creator of the first processing item is not the owner of the first online document (i.e., the one with ownership), the first online document may not be added to the first processing item, and the first online document can only be added to the first processing item when the owner of the first online document is the creator. After the processing flow is triggered to start, the ownership of the first online document is transferred to the first application, so that the first application can assign the permission of the first online document to the handlers of other nodes. After the processing flow of the first processing item is completed, the ownership is returned to the creator.

In some embodiments, during the execution of the processing flow of the first processing item, according to the predetermined setting, the permissions (permission to view or permission to edit, where the permission to edit includes the permission to view) for the handlers of the service processing node has are opened, and the permission to view and permission to edit can be opened by default to the handlers, or the permission to edit can only be opened to the scheduled handler. In addition, if the permission to view is not opened for the handler of the current node, the handler of the current node cannot read the first online document.

In some embodiments, after the end of the processing flow of first processing item, the node handler will withdraw the first online document permission to edit, the permission for the first online document if the handler may be set to permission to view.

In some embodiments of the present disclosure, during the execution of the processing flow, the permission to edit the first online document is only opened to the handlers of the current service processing node of the processing flow who have the permission to edit; in the processing flow after the end of the recovery of the document permissions assigned to the handler of the service processing node.

In some embodiments, if the creator withdraws the processing flow of first processing item, ownership of the first online document can be returned to the creator of the first processing item from the first application, and all service processing nodes to withdraw the handler of the first online document permission (permission to view and permission to edit), i.e., if the permission for the first online document of the handler of the service processing node, it will restore to the state before creating first processing item.

In some embodiments of the present disclosure, after the handler of the current service processing node rejects the first processing item, the handler of the current service processing node withdraws the permission of the first online document and returns the ownership of the document to the creator of the first processing item.

In some embodiments of the present disclosure, when the handler of the current service processing node will transfer the processing task of the first processing item to another handler, the first online document handler of the current service processing node is applied to the other handler. For example, if the handler of the current service processing node has permission to view, the other handler will also be given permission to view, and the handler of the current service processing node retains the permission of the first online document.

In some embodiments of the present disclosure, the handler of the current service processing node adds a service processing node, the handler of the current service processing node applies the permission of the first online document to the handler of the added service processing node and retains the current service processing node. The handler of the first online document has permission, and if the handler of the current service processing node has permission to view for the first online document, the handler of the added service processing node will also have permission to view.

In some embodiments of the present disclosure, after the service processing node in the processing flow is removed, the handler of the removed node will withdraw the permission of the first online document, and the handler of the removed service processing node can restore the permission of the first online document to the state before the creation of first processing item.

In some embodiments of the present disclosure, when the handler of the current service processing node is rolled back to the previous node, the handler of the current service processing node is applied to the handler of the first online document. For example, the handler of the current service processing node has permission to view, then the handler of the previous node will also have permission to view. In some embodiments, if the service processing node is rolled back to the creator of the first processing item, it is necessary to open the permission to edit for the first online document to the creator.

In some embodiments, after the first processing item is copied or shares, the user who is copied or shared has the permission to read but not edit for the first online document in the first processing item.

In some embodiments of the present disclosure, during the execution of the processing flow of first processing item, the first handler is a handler of at least two service processing nodes. After the first handler processes the first processing item in one of its responsible service processing nodes, and there are still unprocessed service processing nodes for which the first handler is responsible, if the content of the first online document changes, the first handler processes the first processing item again in the unprocessed service processing node. For example, there are three service processing nodes, and handler A is responsible for the first and third nodes. The current processing flow proceeds to the second service processing node. At this time, if the content of the first online document changes, handler A still needs to process the first processing item in the third service processing node and will not stop processing the first processing item because the handler A has already processed the first processing item.

In some embodiments of the present disclosure, the first processing item is combined with the first online document to improve communication efficiency and supports the height adjustment of the document display area of the first online document and free drag and drop and can display the first online document in full screen and hide the full screen display.

For the approval scenarios of enterprises for complex decision-making information, such as document approval such as official documents and systems, as well as attachment approval such as supplier/product qualifications and contracts, some solutions disclosed herein integrate approval with cloud documents to open up the account, permission, information notification and other fields of underlying approval applications and cloud documents. The front-end embeds cloud document components through iframes and other methods and supports approvers to freely drag the displayed window size, ultimately achieving the best experience of approving with cloud documents.

Regarding the accounts, permission, information notifications, and other fields of applications such as bottom-level approval and cloud documents, the permission and information notifications of cloud documents (also known as cloud documents or collaborative documents) can be processed according to the service processing logic of the application. For example, predetermined cloud document permission can be opened for predetermined service processing node handlers or person roles, or notification messages can be sent to relevant handlers of predetermined nodes of the application when the content of cloud documents changes, such as when the comment content changes, so that relevant person can timely or change the content of cloud documents. Since the notification is related to the service processing node person of the application, the integration of the two can be strengthened to ensure that the message can reach the service handler of the service program in a timely manner.

In some embodiments of the present disclosure, a cloud document component can be added to the approval flow (also referred to as the approval process): through approval admin, an cloud document component can be added, and the name, display condition, printing status, archive location, etc. of the cloud document can be set.

In some embodiments, the integration of applet and cloud documents can be achieved: by solving the account, permission, message communication problems between the applet and web applications (such as cloud documents), the integration and interoperability of the two can be achieved.

In some embodiments, regarding the display of cloud documents, the cloud document can be embedded in the approval page by iframe, supporting the approver to freely drag the document window size, and supporting one-click folding, one-click full screen and other operations.

In some embodiments, the current tenant approval and other applications can be achieved in collaboration with an external tenant, wherein the tenant can be understood as a group identifier or organization identifier, generally different enterprises can be understood as different tenants. Open external permission to edit through cloud documents, the problem of cross-tenant content approval can be approved.

In some embodiments, regarding the operation permission of the approver on the cloud document, the approval admin can support setting the permission of each approver or approval role on the cloud document, such as permission to edit, read, share, etc.

In some embodiments, regarding the transfer of the cloud document ownership, the application is associated with the cloud document, and after the application proceeds to a predetermined service processing node or reaches a predetermined service processing state, the owner of the cloud document can be changed to the application or a service handler related to the cloud document in the application, thereby facilitating subsequent permission changes. For example, in the approval scenario, after submitting approval, the document owner is transferred from initiator to the application by calling up the document owner transfer interface, which facilitates subsequent application to change document permission.

In some embodiments, regarding the cloud document permission processing, in the approval scenario, the document "Update Collaborator Permission" interface is retrieved to change the cloud document permission along with the approval processing such as approving/rejecting, forwarding, adding/removing approvals, returning, copying, and sharing.

In some embodiments, based on the change of document content, the handler that appear repeatedly in the application can be deduplicated to avoid the same person from doing duplicate processing of the same document content. For example, in the approval scenario, when the same approver appears repeatedly in the approval process, if the document content changes, it needs to be re-approved; otherwise, it is automatically skipped, that is, if the document content has not changed, the approver of the current approval node can automatically skip if the document content has been approved before in the approval process.

In some embodiments, regarding the writing of document content, the first processing item or the processing node link related to the first processing item can be embedded in the document through the association between the first processing item of the application and the document, or a new document can be generated based on the above first processing item or the processing node link. For example, in the approval scenario, the approval link can be written into the document through the association between the approval documentation and the document, and it supports returning to the approval with one click in the document to view the approval details.

In some embodiments, a category "cloud work" and a control for "cloud document" can be added in the approval admin. The widget name, prompt text, and permission settings entrance can be set.

In some embodiments, automatic archiving can be supported, and whether to archive the cloud document after approval can be selected. If archived, open the wiki and select the specific wiki node to be archived; it is possible to also choose whether to transfer the owner of the cloud document to the wiki owner.

By matching the account of the application associated with the cloud document (for example, the approval process and the cloud document share the same ID, or the IDs of the two are related) as an ID, communication is carried out, and the ability of permission such as comment notification, document reading and editing is opened, and the integration of the two applications is realized. The original submitter does not have permission for access the other party's approval process and cannot submit materials. With the permission diffusion ability of the document, external users can complete the work of material submission.

Application scenarios: Cloud document components can be embedded in any applet, including Applet approval, reporting, OKR, and any applet.

This technical solution can be used for any service scenario that requires information bearing with documents.

Web cloud documents and Applet approval applications can be integrated and displayed through iframe.

By highly adapting the front-end to the cloud document component and supporting free dragging of the document window, the best browsing and approval experience is achieved.

Implementation of freely dragging the height of the document window:

Layout: In the applet, View is used as a container with an initial height and a maximum height. The iframe component of the document is placed inside the View container, and a View is added as a drag-and-drop operation element. The operation element is located at the bottom of the container element, with a higher level than any other element in the container and a slight height guarantee that it can be clicked.

Interaction: Trigger the touchstart event by clicking on the operation element. At this time, enter the drag mode and record the height position (mouse or finger) at this time. In the drag mode, hold down the mouse or hold down the screen (touch screen) to drag or slide to trigger the touchmove event. The difference between the obtained position height and the recorded height when entering the drag mode is determined based on the mouse (or finger) position obtained in each touchmove event (there is a negative value), and then the determined height difference value is added to the new height value based on the existing container height. Safety threshold is checked for the obtained new height. If it exceeds the threshold, it is stopped at the threshold edge (i.e., maximum or minimum value), and then the new height of the container is set. Finally, when the mouse (or finger) is released, the last height in this drag mode in the touch end (touchend) event, and the drag mode is closed after recording the container height.

Cut-off: To freely control the balance between fluency and performance, the cut-off control can be performed on the height setting frequency. Reset the height frequency every second and whether to refresh the interface when exceeding the threshold. The actual implementation frequency can achieve stepless control between the touchmove event trigger frequency and 0 times/second, but the actual product will be limited to a fixed value. The specific value should be considered comprehensively according to the actual product requirements, fluency experience, and software performance.

It supports mobile adaptation. Click on the cloud document component to browse in full screen.

Regarding the processing of cloud document permission, in some embodiments, in the approval scenario, external permission to edit can be opened for cloud documents by approving initiators (such as document owners), so that external tenant content supply persons have document permission to edit, in order to solve the cross-tenant content approval scenario.

Method 1: Add external collaborators as document collaborators and grant permission to edit.

Method 2: Enable link sharing, set it to "editable by people who get links on the Internet", and add a password.

In the approval process, each approver can configure document permission such as "readable" and "edit".

Regarding the change of document permission, the exemplary explanation is as follows.

About permission revocation: After the initiator submits the approval, the document owner is transferred to the approval application. The approval application withdraws the permission to edit of the document collaborator, does not withdraw the readable permission, and others can only read it.

About permission release: Return to the initiator, the document owner is still the approver, but the permission to edit is released to the original editor or owner between submission for approval.

About permission granting: During the approval process, according to the background settings, the reading and permission to edit of the corresponding approval process approver are enabled (the background sets the reading/permission to edit of specific approvers), and the "readable" and "edit" are enabled by default. The permission to edit is only assigned to the approver.

If the "Read" permission is not enabled, the current node person is not visible to the "Cloud Document Control".

About permission withdrawal: After the approval is completed, the "edit" permission of the approver at this node will be withdrawn, which can only be read.

Regarding permission handling for initiator operations, when withdrawing an approval request, the document owner is returned from the app to the initiator. And the document collaboration permission of all approvers is withdrawn.

About Approver's Permission Processing:

In case of approval rejection: The current approver withdraws document permission, including edit/permission to views, which is deemed to have removed collaborators. At the same time, the document owner is returned from the application to the originator.

When transferring approval items to others for approval: Apply the current approver's document permission to the referred person. If the current approver has permission to view for the document, the referred person will grant permission to view for the document. At the same time, the approver's original permission is retained.

In the case of adding approvers, that is, when other approvers are added: the document permission of the current approver are applied to the approver. If the current approver has permission to view for the document, the approver will grant permission to view for the document. At the same time, the approver's original permission is retained.

In the case of reducing approvers: withdraw the document permission of the approver who has been reduced.

In the case of rollback, that is, when the approval node is returned to the previous approval node: The document permission set for the current approval node are opened for the rollback person. If it is rolled back to initiator, the initiator needs to be assigned permission to edit.

In the case of copy and sharing, when the approval item is copied to others or share it with others, it is possible to only enable predetermined permission for the copy or shared person, such as read document permission.

Automatic deduplicate of approver can also be realized: For scenarios where the same approver needs to approve at different nodes, if the document content changes after the approver's approval, the next approval node needs to be re-approved. For example, it is possible to determine whether the document version has undergone a predetermined change by calling the document version change interface or obtaining document version information, so that when the predetermined change occurs, the corresponding approver can be approved. Alternatively, when there is no predetermined change, skip the approver at a certain section when the approver has seen the corresponding information of the current version to avoid repeated approval.

The examples of approval have been described above where the document permissions changes with changes of the service logic and service process. It can be seen that when an application is associated with an online document, the permission of the online document can be processed based on the service processing logic and process of the application. For example, when the predetermined service node is reached, the document permission of the relevant person of the node are changed. Another example is to withdraw the document permission of the predetermined person after the predetermined service node is processed.

Figure 10:
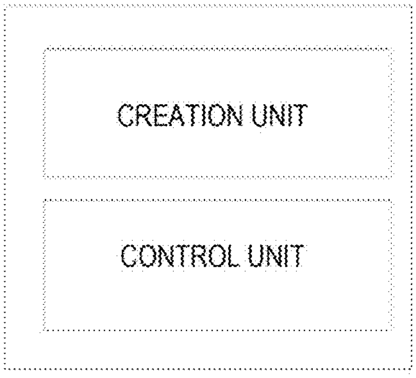
FIG. 10 is a schematic diagram of an apparatus for information processing according to an embodiment of the present disclosure.

As shown in FIG. 10, the present embodiment also provides an apparatus for information processing, comprising:

a creation unit for configured for creating a first processing item having a first online document in response to a first operation event; and a control unit configured for triggering a processing flow of the first processing item in response to the second operation event.

According to one or more embodiments of the present disclosure, there is provided an apparatus for information processing, further comprising a setting unit configured for, in response to the flow creation operation, setting the document processing node of the service processing flow and the handler of the service processing node permission.

According to one or more embodiments of the present disclosure, there is provided an apparatus for information processing, prior to creating a first processing item in response to a first operation event, further comprising: a template creation unit configured for creating an item template for processing an item having a control for adding an online document in the item template; and the first processing item is established based on the item template.

According to one or more embodiments of the present disclosure, there is provided an apparatus for information processing, the control unit is further configured to display the first processing item in the control target communication software handler of the node of the processing flow.

According to one or more embodiments of the present disclosure, there is provided an apparatus for information processing having a document display area for displaying the first online document in the display interface of the first processing item, the document display area, the size and/or position of the document display area are adjustable.

According to one or more embodiments of the present disclosure, there is provided an apparatus for information processing, the creator of the first processing item is the owner of the first online document, and after triggering the processing flow of the first processing item, ownership of the first online document is transferred from the creator of the first processing item to the first application; after the processing flow of the first processing item is completed, ownership of the first online document is returned to the creator of the first processing item.

According to one or more embodiments of the present disclosure, there is provided an apparatus for information processing, during the execution of the processing flow, the permission to edit for the first online document is only opened to the handler of the current service processing node of the processing flow who has the permission to edit; after the end of the processing flow, the document permission assigned to the handler of the service processing node is withdrawn. According to one or more embodiments of the present disclosure, there is provided an information processing method comprising:

Before the predetermined processing node corresponding to the processing request for the first file, the target save address of the first file is determined in response to a user operation, so that the first file is saved to the target save address after the processing request is completed.

According to one or more embodiments of the present disclosure, there is provided a method of information processing, comprising:

Step A: at a time before the end of a service processing flow about a first file, determining a save strategy for the first file in response to a user operation, so that the first file is saved based on the save strategy after the end of the service processing flow.

Illustratively, the service processing flow includes, but is not limited to, approval flow, reporting flow, project management flow, etc.; the first file includes files or attachments processed by the service processing flow, such as approval file, reporting file, project file.

In some embodiments, the save strategy for the first file comprises at least one of: whether to save the first file, a target save address of the first file, and a save duration of the first file.

In some embodiments, the method of information processing further includes: converting the first file to an online file or adding it to an online file; saving the online file to a server based on the saving strategy after the service processing flow ends. For example, in response to the user uploading the first file, the first file can be converted into an online file or added to a predetermined online file as an attachment, and after the service processing flow is completed, the first file can be saved together with the online file based on the predefined save strategy. In this embodiment, by converting the first file into an online file or adding it to an online file, it is possible to save the first file as an online file or a part of an online file to the server based on a predefined save strategy after the service processing flow is completed.

In some embodiments, a target save address input interface may be displayed, in response to a user input operation to determine the target save address.

According to one or more embodiments of the present disclosure, by determining the save strategy of the first file based on the user operation at a time before the end of the service processing flow of the first file, the first file may be processed during the service processing flow automatically and be saved based on a predefined save strategy. As a result, the file related to the service processing flow can be archived efficiently and conveniently, improving file processing efficiency.

In some embodiments, the user comprises a creator of the service processing flow or a user with a predetermined management permission. Illustratively, the user with predetermined management permissions may be a background manager of the service processing flow. According to embodiments of the present disclosure, the creator of the service processing flow or the user with predetermined management permissions may be able to define a save strategy for the first file, which may improve the efficiency and flexibility of file saving.

In some embodiments, step A comprises:

Step A11: before the creation of the service processing flow, in response to a user operation with a predetermined management permission, determining a target save address or a predetermined save address range of the first file.

Illustratively, the predetermined save address range may include a file save directory, the target save address may include a specific file folder in the file save directory.

In an embodiment, by enabling the user with predetermined management permissions to predefine the target save address or the predetermined save address range of the first file before creating the service flow, the standardization of file saving can be improved, thereby facilitating management, and also the user can select a specific save address within the save address range, thereby providing a certain degree of flexibility to meet actual needs.

In some embodiments, step A further comprises:

Step A12: during the creation process of the service flow, determining a target save address of the first file based on an address determined by a creator of the service processing flow from a predetermined save address range.

In this embodiment, the target save address is determined based on the address determined by the creator of the service processing flow from the predetermined save address range determined by the user with predetermined management permissions, thereby ensuring file save at the same time standardization and flexibility.

Figure 11:
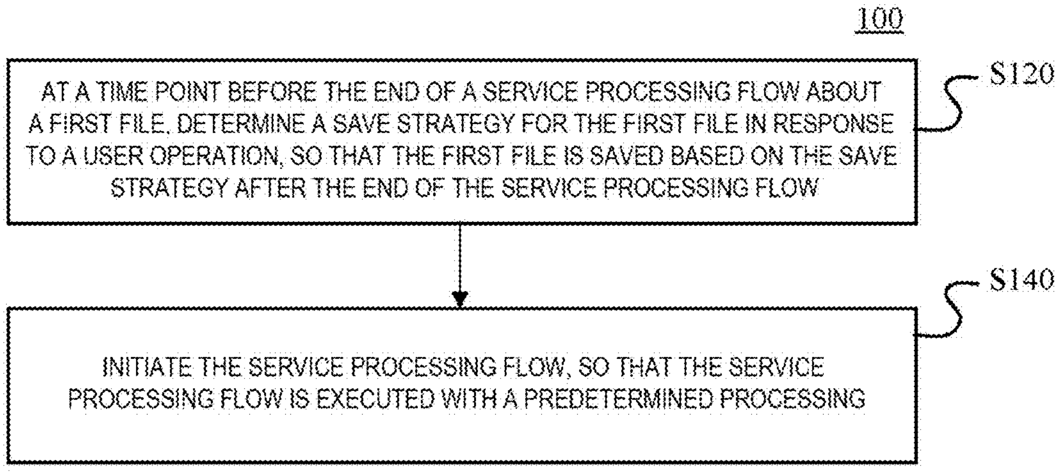
FIG. 11 is a flowchart of a method for information processing according to an embodiment of the present disclosure.

Referring to FIG. 11, FIG. 11 shows a flow diagram of a method of information processing 100 according to an embodiment of the present disclosure, the method 100 includes:

Step S120: at a time before the end of a service processing flow about a first file, determine a save strategy for the first file in response to a user operation, so that the first file is saved based on the save strategy after the end of the service processing flow;

Step S140: initiate the service processing flow, so that the service processing flow is executed with a predetermined processing; wherein the target save address after the end of the service processing flow, the first file save address.

In some embodiments, in response to a user operation of the predetermined identifier, the display one or more levels of file save directory, the user can select a specific directory location in the file save directory, so that the user can select the directory location to determine the target save address of the first file.

For example, the service processing flow may be a flow for one or more of its users to approve the first file.

In some embodiments, the first file includes but is not limited to documents, images, multimedia electronic files, application files and the like.

In some embodiments, the service processing flow may include the first file or the link information corresponding to the first file, so as to facilitate the service processing flow of the handler to obtain the first file, thereby speeding up the processing process.

It should be noted that the time before the end of a service processing flow may include before the end of the processing process of the service processing flow. For example, before the creation of the service processing flow, during a creation process, before initiating the service processing flow or during a processing process.

Preferably, step S120 is executed before the service processing flow is sent, such as during the creation of the service processing flow. In this way, the relevant personnel can define the first file save strategy at the same time when creating the service process, and there is no need to separately and specifically set the target save position of the first file, for example, rely on specialized managers to independently set the target save position of the first file, thereby improving the efficiency of saving files and saving manpower.

Figure 12:
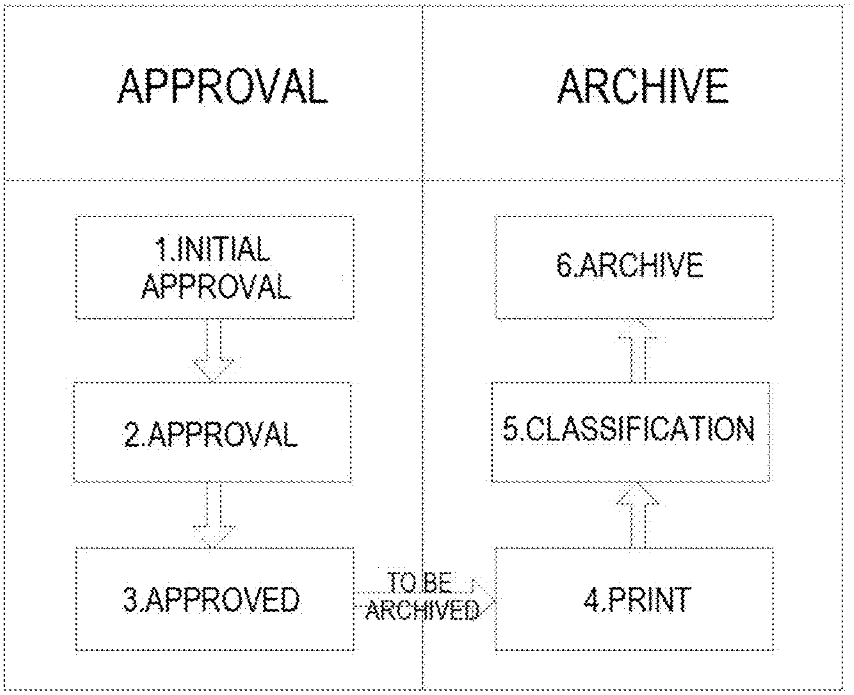
FIG. 12 is a flow chart of the approval process and the filing process of the related art.
Figure 13:
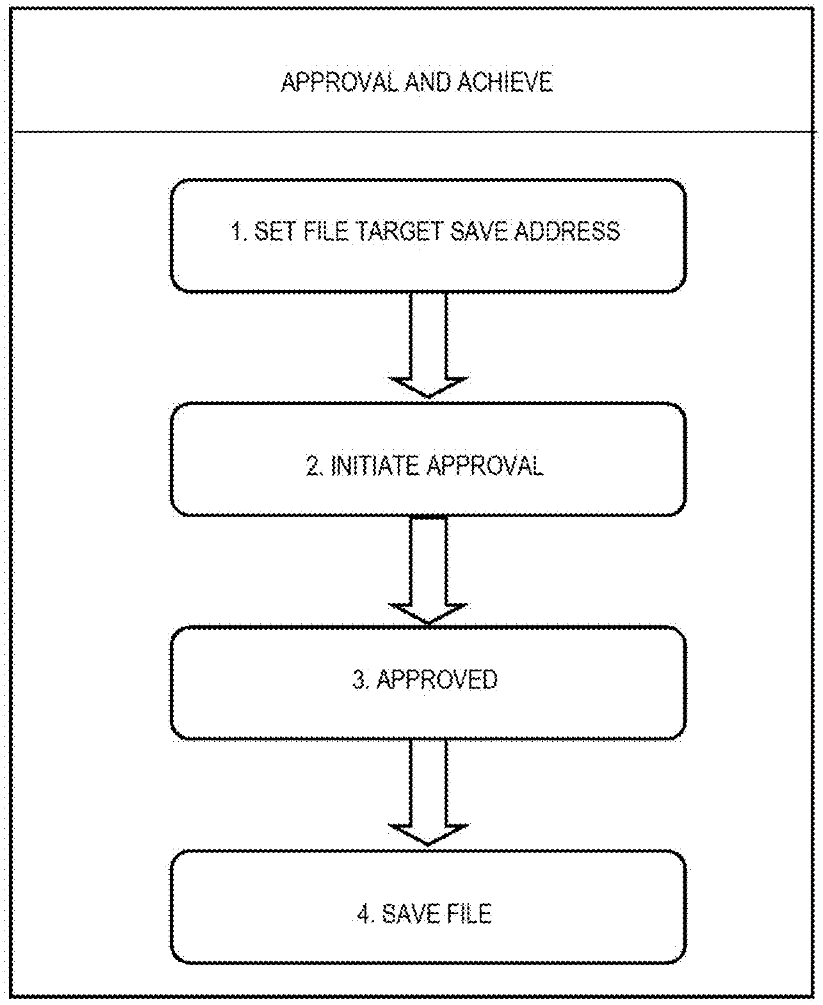
FIG. 13 is a flowchart of an approval filing process according to an embodiment of the present disclosure.

The following is an example of document approval. Referring to FIG. 12, the relevant document approval archiving process (manual archiving) includes initiating a document approval request, one or more person approving the document, approving it, printing, classifying, and archiving the document. Similarly, the electronic archiving process also requires special operation steps to electronically archive the document after the approval process is completed, and the archiving efficiency is low, requiring additional manpower. Referring to FIG. 13, the method of information processing provided according to one or more embodiments of the present disclosure, before initiating approval, relevant person can set that the document to be approved should be saved in a directory in a certain cloud storage space after approval. In this way, when the document to be approved is completed, the system can automatically save the file according to the predefined archiving strategy without special archiving operations, realizing the synchronization of archiving and approving the document, thereby improving the efficiency of approval and archiving and saving manpower.

According to one or more embodiments of the present disclosure, by determining the target save address of the first file based on the user operation before the end of the service processing flow of the first file, the first file can be automatically saved to the target save address after the service processing flow regarding the first file is processed. There is no need to wait until the end of the service processing flow to save files through specialized file save operations, achieving synchronization between file saving and service processing flow, thereby improving file processing efficiency.

In some embodiments, before performing step S120, in response to the user's operation, it is determined whether to perform a predetermined save on the first file after the service processing flow is processed. For example, the user can set whether to archive the file after approval before initiating file approval. If so, they can further set the archive address of the first file, which is the target save address.

In some embodiments, the initiation request of the service processing flow includes indication information of the target save address. In this embodiment, by further including indication information of the target save address in the service processing flow initiation request regarding the first file, the first file can be saved to the corresponding target save address according to the indication information after the service processing flow ends.

The information method according to one or more embodiments of the present disclosure further includes: during the processing process of the service processing flow, displaying the save strategy in a display interface corresponding to the service processing flow. In this way, by displaying the defined save strategy during the processing process of the service processing flow, it may be convenient for relevant personnel in the flow to obtain the save strategy, thereby facilitating subsequent processing.

The information method according to one or more embodiments of the present disclosure, further comprising: modifying the first file save strategy in response to a user operation during the processing process of the service processing flow. According to this embodiment, the user can modify the first file save strategy during the processing process of the service processing flow, so as to update the save strategy according to changes in requirements.

In some embodiments, if the first file is a document, the method 100 further comprises:

Step S150: After the service processing flow is processed, the processing information corresponding to the service processing flow is displayed at a predetermined position in the document.

In some embodiments, the processing information includes, but is not limited to, processing node information, handler information, processing opinion information, processing time information.

The following is an example of document approval. According to one or more embodiments of the present disclosure, after the approval is completed, approval information about the document can be displayed at a predetermined position in the approved document, such as below the title, including but not limited to approval node information, approver information, approval comment information, approval time information, etc., such as "approval node: department approval", "approver: department manager, Zhang San", "comment approval: agree", "approval time: Jan. 1, 2021", so that subsequent users of the document can easily access the approval information related to the document by opening the document. For example, after the approval is completed, the approval information of the document can be automatically generated in the document through a predetermined API (Application Programming Interface).

In this way, by displaying processing information corresponding to the service processing flow at a predetermined position within the document after the service processing flow is processed, it is possible to facilitate subsequent possible review and review of the document or corresponding processing flow, such as enterprise financial review, audit, etc.

In some embodiments, the process information includes link information configured to display the process details information in response to a user's operation. in this way, by displaying the link information only within the document, the content of the document itself is not unduly affected, and it is also convenient for the user to click to view the process details information corresponding to the document.

In some embodiments, step A comprises:

Step A21: display a file save directory corresponding to a server;

Step A22: in response to a user operation on the file save directory, determine a target save address of the first file.

For example, the file save directory of the cloud server can be displayed in the client for the user to select the target save address of the first file in the cloud server from the file save directory; It is also possible to update the file save directory displayed on the client in real-time or periodically through a predetermined interface, thereby achieving synchronization between the file save directory displayed on the client and the file save directory on the cloud server.

The information method according to one or more embodiments of the present disclosure, further comprising:

Step B: pre-establish an association relationship between a server and an application for processing the service processing flow, so that the first file is capable of being saved in the server based on a target save address determined by a user operation.

Further, in some embodiments, step B comprises: predetermine a first interface corresponding to the server in the application; the first interface is configured to be able to display a file save directory of the server in the application, and save the first file to the server based on a target save address determined by a user from the file save directory. In this embodiment, by pre-establishing a first interface, the server is associated with the application used for the service processing flow, allowing the application to display the server's file save directory and save the first file to a specific folder in the file save directory based on user instructions.

The information method according to one or more embodiments of the present disclosure, further comprising: during the processing process of the service processing flow, modifying the save strategy in response to a user operation.

The following will be described using cloud file approval as an example. According to one or more embodiments of the present disclosure, by using cloud files as carriers for approval items containing files, when users create approvals, they specify specific cloud space archive directories for subsequent cloud files, and set corresponding directory nodes for approval form options, so that after the approval is completed, the cloud files included in the approval items are automatically archived to the corresponding cloud space directory nodes by calling the cloud space archive interface, so as to achieve efficient and fast approval file archiving capabilities.

The conventional approach is to decide whether to archive the approval documents and execute the archiving steps only after the approval is completed. This disclosure allows the approver to set whether the approval documents need to be archived and in which directory before the predetermined node in the approval process, such as before the approval is initiated or completed. Because the archive is stored in cloud space, the archived content is not limited to text files, but also supports different forms of electronic information records such as text, charts, audio, and video.

In some embodiments, it is possible to check whether the approval procedure corresponding to the approval file must belong to the file to be archived. If so, for example, if the archive information is not selected, or the approval is not passed, the next step is not allowed, for example, the approval file archive.

In some embodiments, automatic archiving is achieved by establishing an association between the cloud file storage center and the approval program, such as opening a directory interface of the cloud file storage center, calling the directory interface through the approval program, and storing the approval file corresponding to the approval program in a specified directory. Here the directory structure of the cloud file storage center can be set in advance.

In some embodiments, the directory structure information can be called in the approval process based on the predetermined directory structure, for the user to select the specified online document stored in which directory.

Further details are provided below, as shown in the following example:

About the Archive Directory Interface:

In one way, one of the steps to achieve automatic archiving is to predetermine the archive directory interface of the approval file. Through this archive interface, automatic archiving can be carried out according to the archive directory designated by relevant person after the approval is completed. The setting of the archive directory interface first forms a standardized archive information directory, and then exchanges system information between archive directories through relevant interface technologies.

Of course, in other embodiments, it is also possible to create or modify the directory information in the approval process, synchronize the newly created or modified directory information to the cloud file storage center to update the directory structure of the cloud file storage center, so as to facilitate users to update the cloud file directory flexibly in the approval process. In order to avoid users updating the cloud file directory at any time, resulting in non-standard file archiving, predetermined verification rules can also be set, or a predetermined approval entry for directory updates. Only if the new or modified archive directory meets the predetermined verification rules, such new creation and modification are allowed. Alternatively, only by modifying or creating a directory through the approval entry can the archive directory be successfully modified or updated in the cloud file storage center.

About the Archive Directory:

The archive directory is a directory used to store files, which can be a folder used to store files. The archive directory can include first-level, second-level, third-level directories configured according to enterprise service. The archive interface can save or mount the approval file at a specified location in the archive directory based on the file identifier corresponding to the approval file, such as a token, and the directory information corresponding to the target save address, such as the directory ID.

In some embodiments, the directory information corresponding to the target save address may be included in the approval file or the approval request, the directory information may include the archive directory ID and archive description information that the approval file needs to be archived. Archiving can be achieved by identifying the directory and archive description information in the directory information. By way of example, the archive description information may include directory information of the archive directory.

Typically, the final determined archive directory needs to be confirmed by the user, in order to ensure the accuracy of the archive, of course, in some embodiments, the confirmation may not be necessary.

The archive directory data structure can be a hierarchical structure such as a tree.

In one embodiment, the first online document can be generated according to the service data associated with the service node, or the content data carried in the first online document can be processed. In the approval scenario, approval information (also referred to as approval-related information) can be generated based on one or more of the approval nodes, approvers, and approval progress-related information in the approval program, and the approval information can be carried in the online document and subsequently archived in the cloud file storage center. The new online document can be generated, and the approval information can be written in the newly generated online document, or in the predetermined area of the existing online document. The written approval information can be displayed in a predetermined format. In one way, the approval information can be displayed in a predetermined format below the title of the online document. For example, the approval-related information can be displayed in the form of an API link. Through the API link, it is possible to jump to the corresponding approval program or open the approval information details. In one embodiment, the approval document information may be information automatically generated after approval, or information that is updated with the process of approval. It can be written under the online document title in the form of a link through the API and saved together in the archive directory. Approval-related information may include: the name of each approval process, the operator, the content of the opinion, the approval time and other information. Among them, through the API interface, page information recognition, predetermined field value extraction, etc., to obtain approval-related information from the approval process.

The disclosed solution, in addition to being applicable to the archiving of online documents, can also be applicable to the archiving of non-online documents in the approval process, such as automatically uploading non-online documents to a specified archive directory, or converting them into online documents and storing them in a specified archive directory.

The information method according to one or more embodiments of the present disclosure, further comprising: loading the first file in response to a user's operation during the processing process of the service processing flow, so that relevant personnel can load the first file in real time during the service processing flow for service processing.

In some embodiments, there is provided an apparatus for information processing according to an embodiment of the present disclosure, comprising:

a determination unit configured for, at a time before the end of a service processing flow about a first file, determining a save strategy for the first file in response to a user operation, so that the first file is saved based on the save strategy after the end of the service processing flow.

According to one or more embodiments of the present disclosure, there is provided a method of information processing, comprising:

Step C1: determining a second file associated with a first application, the second file comprising a non-online file;

Step C2: converting the second file into a first online file or adding the second file to the first online file;

Step C3: determining a file save strategy associated with the first application, the file save strategy comprising online save address information; and Step C4: saving the first online file to an online save address indicated by the file save strategy.

According to one or more embodiments of the present disclosure, by determining a second file associated with a first application, the second file comprising a non-online file, the second file includes a non-online file, converting the second file into a first online file or adding the second file to the first online file, determining a file save strategy associated with the first application, the file save strategy comprising online save address information, and saving the first online file to an online save address indicated by the file save strategy, may automatically convert the non-online file into an online file, or add it to the online file, and then archived to the online storage space, thereby achieving automatic online archive of attachments, facilitating application non-online file archive, improving archive efficiency, and saving local storage space.

Further, in some embodiments, the method of information processing further comprises:

Step C10: pre-establish an association relationship between the first application and an online file storage server, so that an archive directory interface of the online file storage server is able to be invoked by the first application, and determining the online save address information by the archive directory interface.

Further, in some embodiments, the method of information processing further comprises:

Step C20: generate the first online file based on information of the first application.

Illustratively, a new online file may be generated based on the name of the first application, identification, etc., for carrying the attachment of the first application.

In some embodiments, step C20 comprises:

Step C21: displaying link information of the first application at a predetermined position of the first online file, the link information being configured to jump to the first application.

According to one or more embodiments of the present disclosure, by displaying the link information of the first application at a predetermined location of the first online file, enriching the content generation method of the first file, making it more convenient to reach the application associated with the first file, and also making the connection between the first file and the first application closer and information viewing more convenient.

In some embodiments, the first information is displayed between the title and the body of the first online file. In this embodiment, by displaying the first information between the title and the body of the first online file, it is easy for users who browse the first file to quickly locate the first information without disrupting the original content and format of the first document.

In some embodiments, displaying link information of the first application at a predetermined position of the first online file includes: updating link information of the first information in response to a service processing progress update of the first application, the link information being used to display the updated first information after being triggered. In this example, by updating the link information in response to the service processing flow of the first application, the first information can reflect the latest service processing flow in real time.

Figure 14:
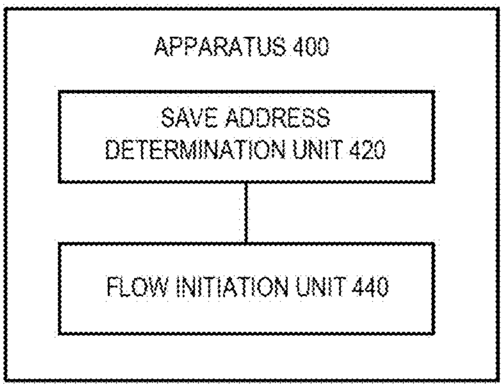
FIG. 14 is a schematic diagram of an apparatus information processing according to an embodiment of the present disclosure.

Accordingly, as shown in FIG. 14, there is provided an apparatus for information processing 400 according to an embodiment of the present disclosure, comprising:

a save address determination unit 420 configured to determine the target save address of the first file in response to user operations before the predetermined node;

a flow initiation unit 440 for initiating the service processing flow, so that the service processing flow is performed predetermined processing; wherein the target save address is a save address of the first file after the service processing flow processing is completed.

In some embodiments, the determination unit comprises:

a first determination subunit configured to determine the target save address or predetermined save address range of the first file in response to the operation of a user with predetermined management permissions before the service flow is created.

In some embodiments, the determination unit comprises:

a second determination subunit configured to during the creation of the service processing flow, determining a target save address of the first file based on an address determined by a creator of the service processing flow from a predetermined save address range.

In some embodiments, the apparatus for information processing further comprises:

a flow initiation unit configured for, in response to a user operation, initiating the service processing flow, so that the service processing flow is performed predetermined processing.

In some embodiments, the apparatus for information processing further comprises:

a strategy display unit configured for displaying the saving strategy in the display interface corresponding to the service processing flow during a processing process.

In some embodiments, the determination unit is further configured to display the target save address input interface, in response to a user input operation to determine the target save address.

In some embodiments, the determination unit comprises:

a directory display subunit configured for displaying the file save directory of the corresponding server;

an Address determination subunit configured for, in response to a user operation on the file save directory, determining the target save address of the first file.

In some embodiments, the apparatus for information processing further comprises:

an association unit configured for pre-establishing an association relationship between a server and an application for processing the service processing flow, so that the first file is capable of being saved in the server based on a target save address determined by a user operation.

According to one or more embodiments of the present disclosure, the associated unit comprises:

an interface unit configured for pre-determining a first interface corresponding to the server in the application; the first interface is configured to be able to display a file save directory of the server in the application, and save the first file to the server based on a target save address determined by a user from the file save directory.

In some embodiments, the apparatus for information processing further comprises:

a modifying unit configured for, during a processing process of the service processing flow, in response to a user operation, modifying the saving strategy.

In some embodiments, the apparatus for information processing further comprises:

a loading unit configured for loading the first file in response to a user operation during a processing process of the service processing flow.

In some embodiments, the apparatus for information processing further comprises:

a saving unit configured for saving the first file based on the saving strategy after the end of the service processing flow.

In some embodiments, the apparatus for information processing further comprises:

an online file converting unit configured for converting the first file into an online file or adding to an online file;

an online file saving unit configured for, after the end of the service processing flow, based on the saving strategy saving the online file to the server.

According to one or more embodiments of the present disclosure, there is provided an apparatus for information processing, comprising:

a first file determination unit configured to determine a second file associated with a first application, the second file comprising a non-online file; illustratively, the second file including an attachment of the first application;

a first online file conversion unit configured to convert the second file into a first online file or adding the second file to the first online file;

a file save strategy unit configured to determine a file save strategy associated with the first application, the file save strategy comprising online save address information;

a first online file save unit configured to save the first online file to an online save address indicated by the file save strategy.

Further, in some embodiments, the apparatus for information processing further comprises:

an association relationship pre-establishing unit configured to pre-establish the association relationship between the first application and the online file storage server, so that the first application program can invoke the online file storage server's archive directory interface and determine the online saving address information through the archive directory interface.

Further, in some embodiments, the apparatus for information processing further comprises:

a first online file generating unit configured for generating a first online file according to the information of the first application.

Illustratively, a new online file may be generated based on the name of the first application, identification, etc., for carrying the attachment of the first application.

In some embodiments, the first online file generating unit is configured for displaying link information of the first application at a predetermined position of the first online file, the link information being configured to jump to the first application.

According to one or more embodiments of the present disclosure, by displaying the link information of the first application at a predetermined location of the first online file, enriching the content generation method of the first file, making it more convenient to reach the application associated with the first file, and also making the connection between the first file and the first application closer and information viewing more convenient. For the embodiment of the device, since it basically corresponds to the method embodiment, the relevant parts can be referred to the partial description of the method embodiment. The device embodiment described above is only illustrative, and the module described as a separate module may or may not be separate. Some or all of the modules may be selected according to actual needs to achieve the purpose of the embodiment. Ordinary technicians in this field may understand and implement it without creative labor.

In some document processing scenarios (such as enterprise approval scenarios), approval types such as official documents, systems, qualification review, contracts, etc. often rely on different information or file contents as decision-making basis. The approval process involves communication and collaboration among multiple parties, but the approval process itself needs to be rigorous. Therefore, the information or documents under approval should not be modified at will during the approval process, otherwise online cloud documents cannot be used to carry information or files during the approval process. However, when the approval is not passed, the initiator of the process needs to modify the information or files. After the approval is passed, the information or files are based on the enterprise archiving needs and should not be modified again at this time.

Figure 15:
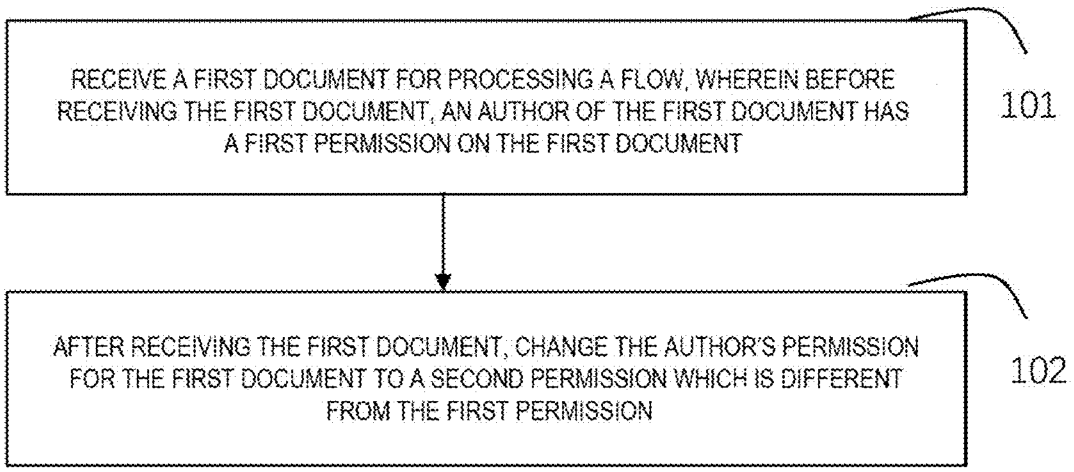
FIG. 15 is a flowchart of a method for information processing according to an embodiment of the present disclosure.

FIG. 15 provides a flow chart of an information processing method of an embodiment of the present disclosure. The information processing method of the present disclosure may include a step 101 of receiving a first document for processing flow. In some embodiments, the first document is a cloud document or an online document. In some embodiments, the first document is referred to as a first online document. In some embodiments, the processing flow is an approval flow, such as approving bills, contracts, Purchase Requisitions, etc.

Figure 16:
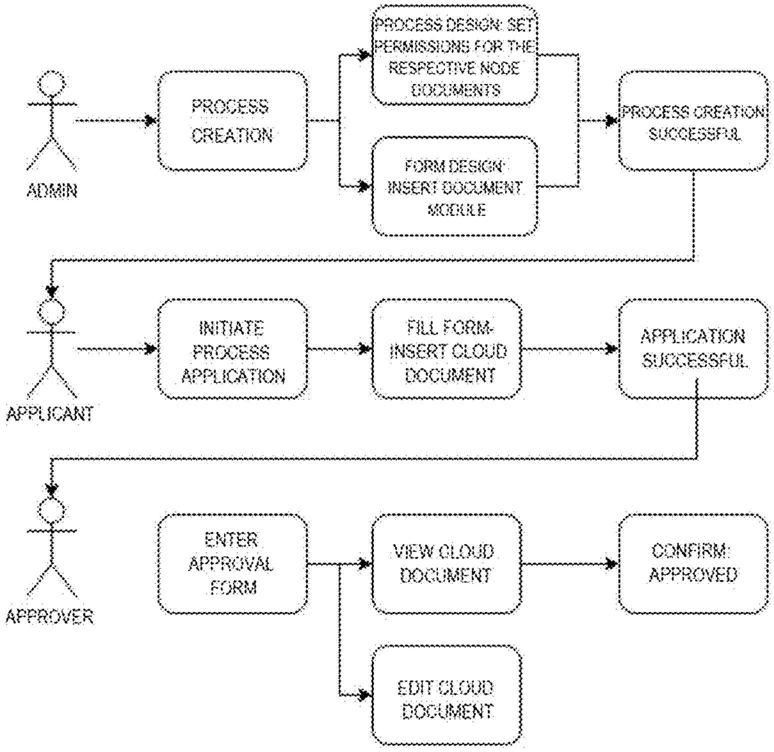
FIG. 16 shows a schematic diagram of a processing flow according to some embodiments of the present disclosure.

FIG. 16 shows a schematic diagram of the processing flow using the approval process as an example. In some embodiments, as shown, the administrator first creates the corresponding approval process, designs the process, and sets the document permission of each node in the approval process. In addition, form design is performed to provide an insert document module. After the process is successfully created, the initiator or applicant of the approval process can initiate an approval process application, fill out the form, and insert the cloud document. After the applicant's application is successful, the approver of each node in the approval process enters the approval form for approval. During the approval process, the approver can usually view and edit the cloud document. After the approver of all nodes confirms that there are no errors, the approval is passed, and the approval process ends.

In some embodiments, the author or original editor of the first document has first access to the first document prior to receiving the first document, i.e., prior to successful application by the applicant or initiator of the processing flow.

In some embodiments, referring to FIG. 15, the method disclosed herein may further comprise the step 102, after receiving the first document, the author's access to the first document is changed to a second permission, the second permission is different from the first permission.

In some embodiments, the first permission is the permission to read and the permission to edit, and the second permission is the permission to read. The permission to read can only read the first document, and the permission to edit can edit the first document.

Figure 17:
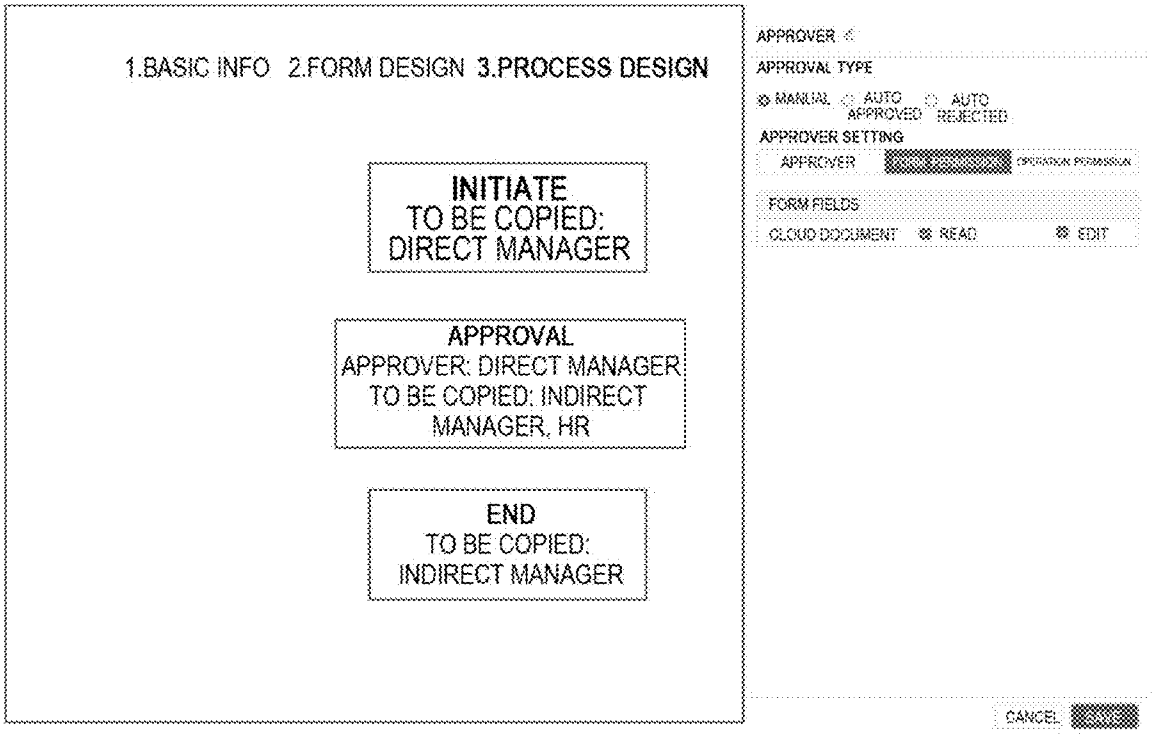
FIG. 17 shows a schematic diagram of the flow design according to some embodiments of the present disclosure.

In some embodiments, the administrator will need to process cloud documents to join the processing node, so that it can obtain the assigned role of the cloud document. In some embodiments, the administrator can specify that the handler has permission to read and permission to edit for the document when assigning the role. As shown in FIG. 17, when the administrator is designing the process, he can set the handler and the persons to be copied at each stage, the processing type, and the corresponding permission of the handler.

In some embodiments, after receiving the first document, the handler in the node of the processing flow has predetermined permission on the first document. In the processing flow creation process, the permission of the handler of each node in the processing flow can be set, and once the first document enters the processing flow, the handler of the corresponding node has the corresponding predetermined permission on the first document. Thus, efficient and unified management of the permission of the first document in the processing flow is facilitated.

In some embodiments, when the first document fails to pass the processing flow or is returned to the initiator of the processing flow, the author's permission for the first document is changed from the second permission to the first permission, that is, the permission to read and the permission to edit. In some embodiments, the first document is not passed through the processing flow or is returned to the initiator of the processing flow due to the form or substance of the first document being unqualified. When this happens, the author may want to modify the first document to meet the corresponding requirements. In this way, by changing the author's permission for the first document from the second permission for the first permission, the processing flow can be sequentially carried out. After the author completes the modification of the first document, the first document that meets the requirements can be submitted for the next processing flow.

In some embodiments, when a first handler in a node of the processing flow transfers a processing task to a further person, the further person has the same permission on the first document as the first handler had on the first document before the transfer. For example, the first handler is the transferor, and the further person is the transferred person. If the first handler has permission to edit on the first document, the further person also has permission to edit on the first document; if the first handler only has reading permission, the further person also has reading permission. In this way, the permission of task processing in the processing flow are handed over or connected in an orderly manner, thereby ensuring rigor in the processing flow.

In some embodiments, when a first handler in a node of the processing flow adds a task node to a further person, the further person and the first handler have the same permission to the first document. That is, the person to be added to the task node has the same permission to the first document as the person to add it. For example, if the first handler has permission to edit to the first document, the further person also has permission to edit to the first document; if the first handler only has permission to read, the further person also has permission to read. In this way, the permission of task processing in the processing flow are handed over or connected in an orderly manner, thereby ensuring rigor in the processing flow.

In some embodiments, when the task node corresponding to the first handler in the processing flow is deleted, the first handler's permission for the first document is withdrawn. When the task node corresponding to the first handler is deleted, the first handler no longer needs to process the first document, and the first handler's permission for the first document is withdrawn, which can avoid unnecessary modifications that the first handler may make to the first document later, thereby ensuring rigor in the processing flow.

In some embodiments, when the processing flow proceeds from the current node to the next node, the first handler of the current node changes the permission of the first document from the first permission for the second permission, and the second handler of the next node changes the permission of the first document from the second permission for the first permission. Since the first handler of the current node has finished processing, changing his permission for the first document from the first permission for the second permission, for example, withdrawing the permission to edit, can avoid inappropriate modifications of the first handler in the subsequent processing flow, and can ensure the rigor in the processing flow. In addition, since the processing flow enters the next node, the permission of the second handler of the next node to the first document is changed from the second permission for the first permission, for example, the permission to edit is added, which can also ensure the smooth processing of the second handler.

In some embodiments, when the processing flow returns from the current node to the previous node, the first handler of the previous node changes the permission of the first document from the second permission for the first permission, and the second handler of the current node changes the permission of the first document from the first permission for the second permission. Since the second handler of the current node has finished processing and returned to the previous node, changing its permission for the first document from the first permission for the second permission, for example, withdrawing the permission to edit, can avoid inappropriate modifications by the second handler in the subsequent processing flow, and can ensure the rigor in the processing flow. In addition, because the processing flow enters and returns to the previous node, the permission of the first handler of the previous node to the first document is changed from the second permission for the first permission, for example, the permission to edit is added, and the smooth processing of the first handler can also be ensured, for example, after editing the first document and then entering the next processing flow in order.

In some embodiments, the persons to be copied and shared only have permission to read and no permission to edit. In some embodiments, the newly assigned user will perform actions on the reassigned document to be processed.

Figure 18:
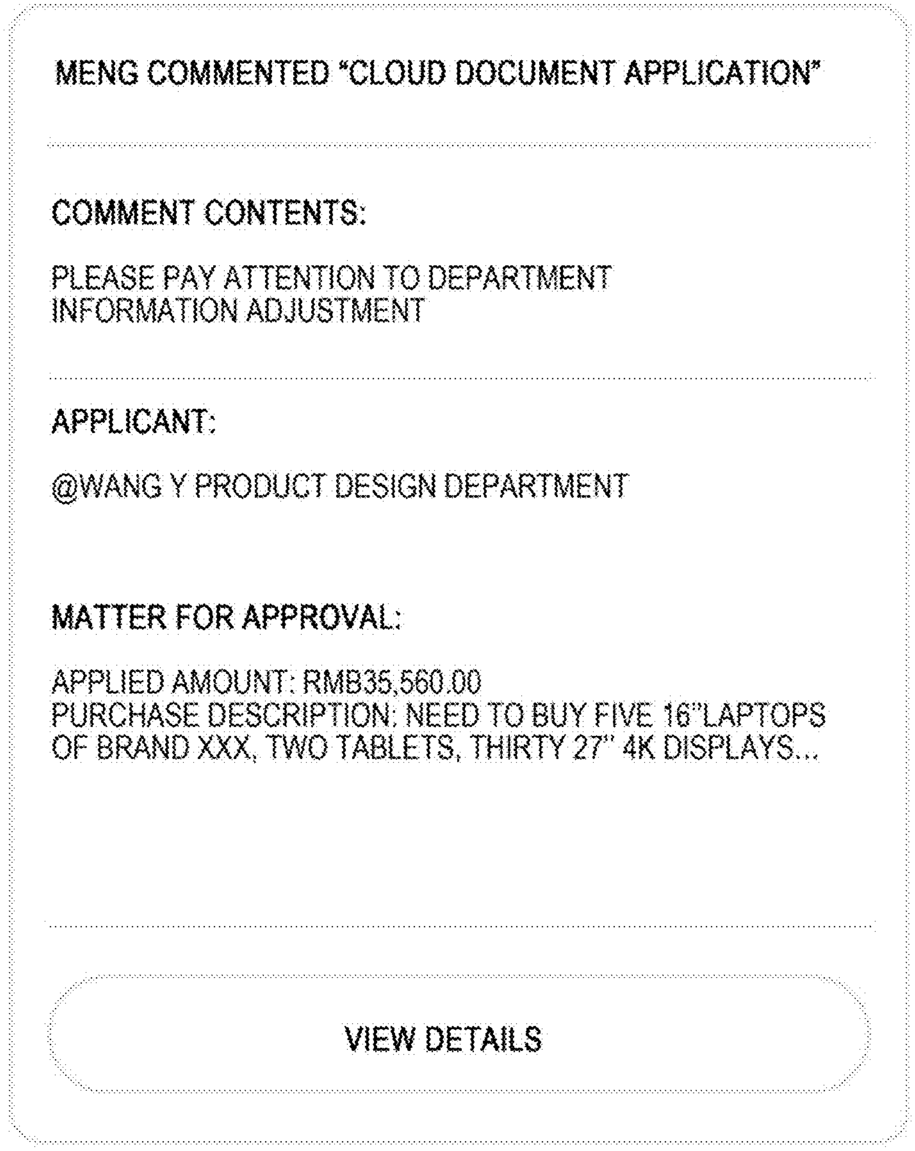
FIG. 18 and FIG. 19 show a schematic diagram of a notification message according to some embodiments of the present disclosure.

In some embodiments, the information processing method of the present disclosure further comprises receiving comment content in the comment area of the first document and sending a notification message to the initiator and the handler of the processing flow when the comment content is not associated with any person in the comment content. In some embodiments, the comment function is turned on by default in the processing flow, which can help the handler quickly notify the initiator of the processing opinion through the comment function, so that the corresponding person can timely adjust the content to be processed according to the processing opinion (for example, the first document). For example, as shown in FIG. 18, Meng's comment content is "Please pay attention to department information adjustment", and there is no @anyone, that is, the comment content is not associated with any specific person. At this time, the notification message shown in FIG. 18 is sent to the initiator and the handler of the processing flow to facilitate them to view and process the comment content in a timely manner. This helps improve the efficiency of processing and collaboration.

Figure 19:
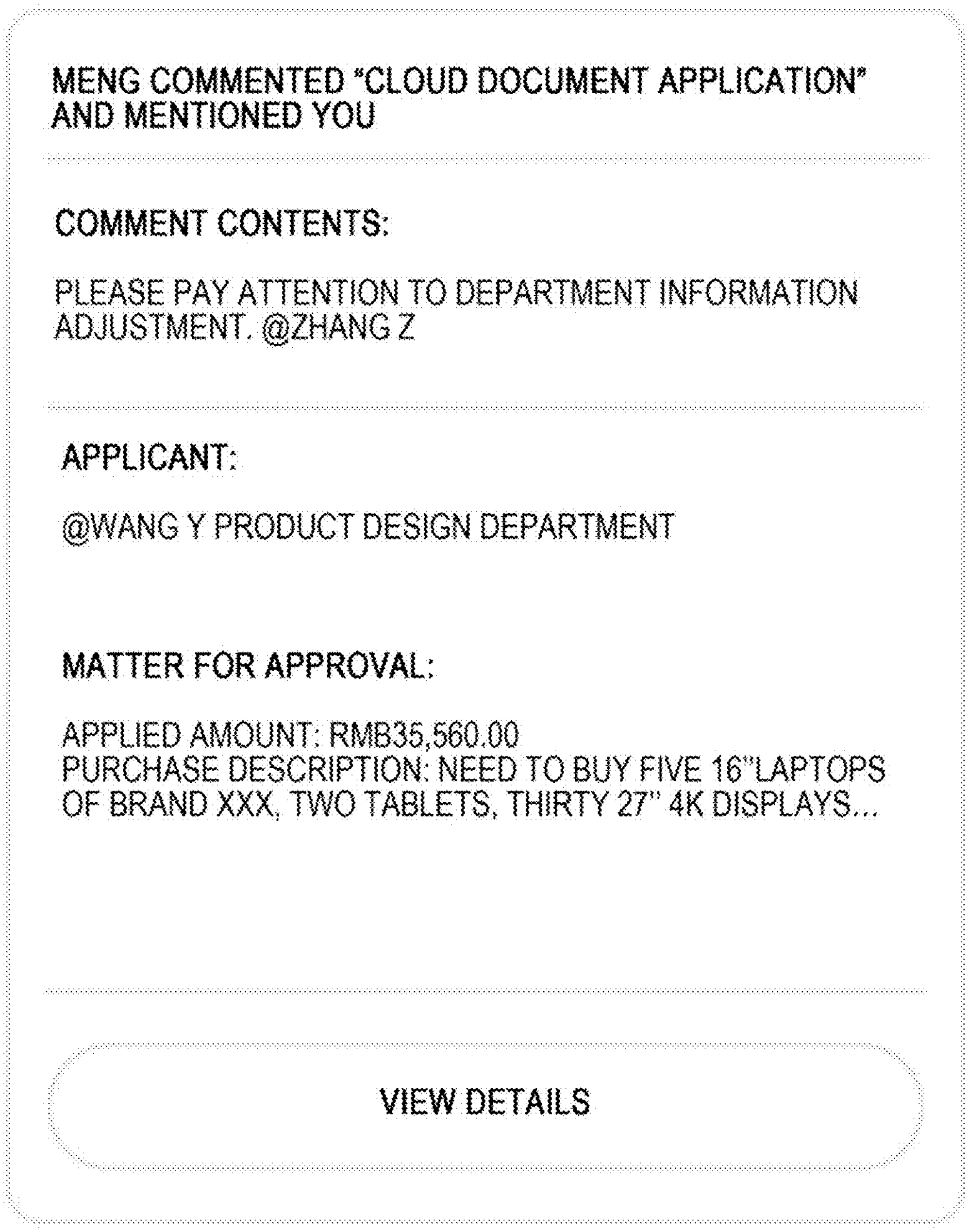
Figure 20:
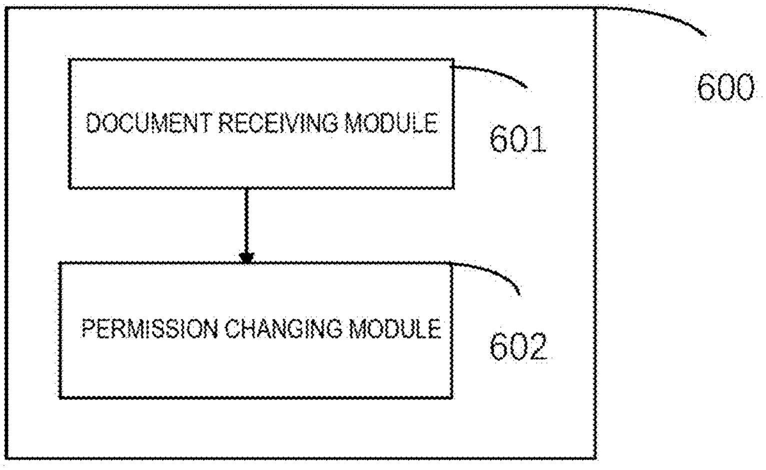
FIG. 20 is a partial module for an apparatus for information processing according to some embodiments of the present disclosure.

In some embodiments, the information processing method of the present disclosure further comprises: receiving comment content in the comment area of the first document, and when the comment content is associated with the handler of the processing flow, sending a notification message to the initiator of the processing flow and the handler associated with the comment content. For example, as shown in FIG. 19, Meng's comment content is "Please pay attention to departmental information adjustment.", and he @Zhang, that is, the comment content is associated with Zhang. When Zhang is the handler of the processing flow (e.g., an approver at a certain node), he sends a notification message as shown in FIG. 19 to the initiator and Zhang of the processing flow, so that the initiator and Zhang of the processing flow can view and process the comment content in time. In addition, in FIGS. 18 and 19, after a corresponding person clicks "View Details", he can directly jump to the corresponding document to be processed for processing.

In some embodiments, the information processing method of the present disclosure further comprises: receiving comment content in the comment area of the first document, associating the comment content with a specific person in the comment content, and sending a reminder message when a specific person has no permission for the first document, reminding whether to open the readable permission of the first document to a specific person. In some embodiments, for example, as shown in FIG. 19, Meng @Zhang in his comment, and Zhang does not have permission for the first document. A reminder message is sent at this time to remind whether to open the readable permission of the first document to Zhang. Thus, it avoids sending a notification message to the corresponding person that the person cannot view the corresponding content.

In some embodiments, a notification message is sent to a particular person when it is determined to open the permission to read of the first document. Similarly, when the permission to read has been opened to Zhang of FIG. 19, a corresponding notification message can be sent to Zhang at this time to facilitate the particular person (e.g., Zhang) to view the comment content in a timely manner.

The disclosed embodiment also provides an apparatus for information processing 600, which includes a document receiving module 201 and a permission changing module 202. In some embodiments, the document receiving module 201 is configured to receive a first document for processing flow, wherein the author of the first document has a first permission for the first document before receiving the first document. In some embodiments, the permission changing module 202 is configured to change the author's permission for the first document to a second permission after receiving the first document, which is different from the first permission.

It should be understood that the content described about the information processing method also applies to the information processing device 600 used here. For simplicity, it will not be described in detail here.

In some embodiments, the first permission is the permission to read and the permission to edit, and the second permission is the permission to read. In some embodiments, after receiving the first document, the handler in the node of the processing flow has predetermined permission on the first document. In some embodiments, the author's permission on the first document is changed from the second permission for the first permission when the first handler in the node of the processing flow transfers the processing task to a further person, the further person has the same permission on the first document as the first handler had before the transfer. In some embodiments, when the first handler in the node of the processing flow adds a task node to a further person, the further person and the first handler have the same permission on the first document. In some embodiments, when the task node corresponding to the first handler in the node of the processing flow is deleted, the first handler's permission on the first document is withdrawn. In some embodiments, when the processing flow proceeds from the current node to the next node, the first handler of the current node changes the permission of the first document from the first permission to the second permission, and the second handler of the next node changes the permission of the first document from the second permission to the first permission. In some embodiments, when the processing flow returns from the current node to the previous node, the permission of the first handler of the previous node to the first document changes from the second permission to the first permission, and the permission of the second handler of the current node to the first document changes from the first permission to the second permission. In some embodiments, the apparatus for information processing further includes a notification module configured to send a notification message to the initiator and the handler of the processing flow when the comment content is received in the comment area of the first document, and the comment content is not associated with any person in the comment content. In some embodiments, the notification module is also configured to send a notification message to the initiator of the processing flow and the handler associated with the comment content when the comment content is received in the comment area of the first document and the comment content is associated with the handler of the processing flow. In some embodiments, the apparatus for information processing further comprises a reminder module configured to receive comment content in the comment area of the first document, the comment content associated with a specific person in the comment content, and a specific person does not have the right to the first document for a limited time, a reminder message is sent to remind whether the permission to read of the first document is opened to a specific person. In some embodiments, the notification module is further configured to send a notification message to a specific person when it is determined that the permission to read of the first document is opened to a specific person.

Regarding the message sending when the cloud document comment content changes, in some embodiments, when the cloud document comment content changes, the approver can be notified to pay attention to the cloud document content change in time through the robot message sending technology.

Scenario 1:

When a specific person is mentioned in the cloud document comment content, for example, by using the @symbol to mention a specific person, if the @person is an approval node person, the approval robot can send messages to the approval submitter and the @person. If the @person does not have cloud document permission or is not a relevant member of the approval node, it can prompt whether to enable the other party (@person) to have permission to read of the cloud document. If so, the document will be enabled to have permission to read, and the cloud document will notify the @person; if the document is not enabled to have permission to read, no notification will be given. The notification can be made in the form of a message card. After clicking the notification to view the details, it is possible to directly jump to the corresponding cloud document approval documentation in the approval application for approval. The content of the notification message can include the comment content, the applicant (also known as the drawer) submitting the approval, the approval reason, etc.

Scenario 2:

When there is no @person in the content of the cloud document, notifications can be sent to the document submitter and the person to be approved. The notification content can include comments, the applicant (also known as the bill of lading person) who submitted the approval, the reason for approval, etc. Among them, in Scenario 1, the reasons why it is not sent to the person to be approved include: 1. @is a scene that clearly needs to be replied to, so it needs to be sent to the person to be @. 2. Sending it to the bill of lading person at the same time is to inform the document owner but does not need to disturb other approvers.

In this disclosure, the ability of the cloud document editing switch permission is called by the application in an interface manner, and the deep integration of the cloud document permission and the application is realized, so that the collaboration ability of the cloud document is the specific service logic and application scenario of the application.

When the service status is switched, for example, when the approval flow status is switched, the permission to edit of cloud documents is automatically adjusted. For example, when the permission to edit is turned off during approval, the permission is reopened if the approval is not passed, and after the approval is passed, the permission is turned off for automatic archiving. It is possible to set permission reasonably to avoid damaging service logic or causing information leakage, etc.

In some embodiments, for applications such as approval with cloud documents, the cloud document comment function can be opened by default during service processing such as approval to achieve better service collaboration such as approval.

Further, the present disclosure also provides a terminal comprising: at least one memory and at least one processor; wherein the memory for storing program code, the processor for calling the program code stored in the memory to perform the information processing method.

In addition, the present disclosure also provides a computer storage medium, which stores program code, and the program code is used to execute the above information processing method.

The information processing method and apparatus of the present disclosure have been described based on embodiments and application examples. In addition, the present disclosure also provides a terminal and a storage medium, the following description of these terminals and storage media.

Figure 21:
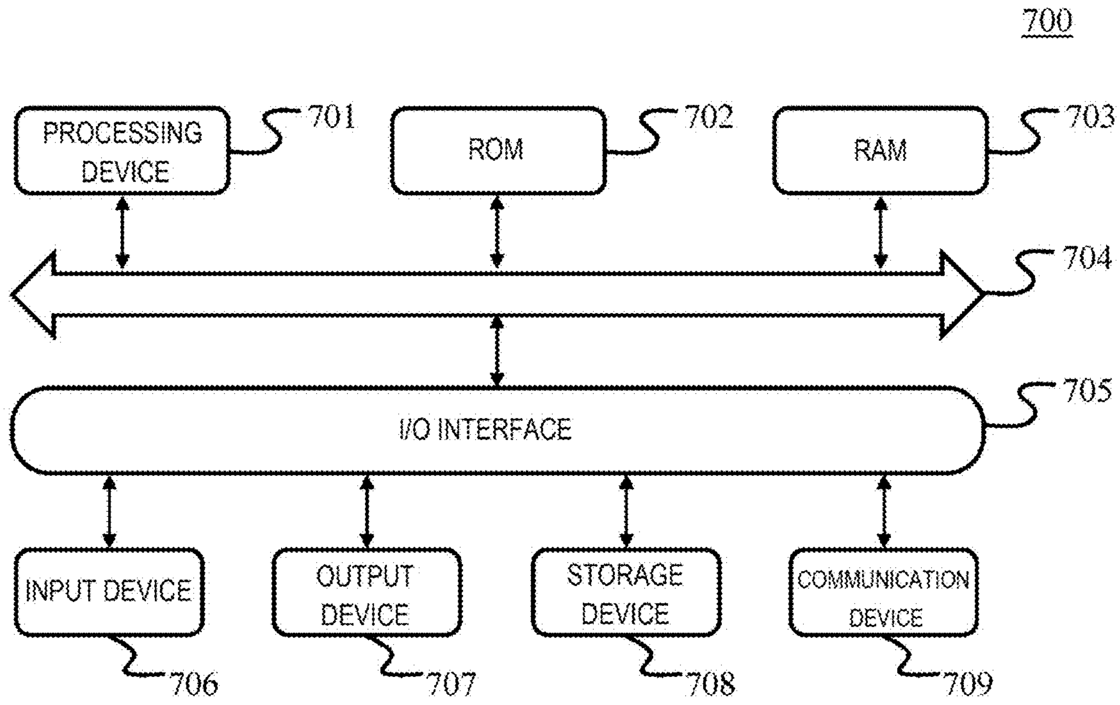
FIG. 21 is a schematic structural diagram of an electronic device according to embodiments of the present disclosure.

Referring now to FIG. 21, which shows a schematic structural diagram of an electronic device (e.g., a terminal device or server) 700 suitable for implementing embodiments of the present disclosure. Terminal devices in the present disclosure may include but are not limited to mobile phones, laptops, digital broadcast receivers, PDAs (personal digital assistants), PADs (tablets), PMPs (portable multimedia players), car terminals (e.g., car navigation terminals), and the like, as well as fixed terminals such as digital TVs, desktop computers, etc. The electronic device shown in FIG. 21 is only one example and should not bring any limitation on the functionality and scope of use of embodiments of the present disclosure.

As shown in FIG. 21, electronic device 700 may include processing devices (such as Central Processor, graphics processing unit, etc.) 701, which can perform various appropriate actions and processes based on programs stored in read-only memory (ROM) 702 or loaded from storage device 708 into random access memory (RAM) 703. In RAM 703, various programs and data required for the operation of electronic device 700 are also stored. Processing devices 701, ROM 702, and RAM 703 are connected to each other through bus 704. Input/output (I/O) interface 705 is also connected to bus 704.

Typically, the following devices can be connected to the I/O interface 705: input devices 706, including touch screens, touchpads, keyboards, mice, cameras, microphones, accelerometers, gyroscopes, etc.; output devices 707, including liquid crystal displays (LCDs), speakers, vibrators, etc.; storage devices 708, including magnetic tapes, hard disks, etc.; and communication devices 709. Communication devices 709 can allow electronic devices 700 to communicate wirelessly or wirelessly with other devices to exchange data. Although FIG. 21 shows electronic devices 700 with various devices, it should be understood that it is not required to implement or have all of the devices shown. More or fewer devices can be implemented or provided alternatively.

In particular, according to embodiments of the present disclosure, the process described above with reference to the flowchart may be implemented as a computer software program. For example, embodiments of the present disclosure include a computer program product comprising a computer program carried on a computer-readable medium, the computer program comprising program code for performing the method shown in the flowchart. In such embodiments, the computer program may be downloaded and installed from the network through the communication device 709, or installed from the storage device 708, or installed from the ROM 702. When the computer program is executed by the processing device 701, the above-described functions defined in the method of the present disclosure are performed.

It should be noted that the computer-readable medium described above in this disclosure can be a computer-readable signal medium or a computer-readable storage medium or any combination thereof. The computer-readable storage medium can be, for example, but not limited to, an electrical, magnetic, optical, electromagnetic, infrared, or semiconductor system, device, or any combination thereof. More specific examples of computer-readable storage media can include but are not limited to: an electrical connection with one or more wires, a portable computer disk, a hard disk, random access memory (RAM), read-only memory (ROM), erasable programmable read-only memory (EPROM or flash memory), optical fibers, portable compact disk read-only memory (CD-ROM), optical storage devices, magnetic storage devices, or any suitable combination thereof. In this disclosure, a computer-readable storage medium can be any tangible medium containing or storing a program that can be used by or in conjunction with an instruction execution system, device, or device. In this disclosure, a computer-readable signal medium can include a data signal propagated in a baseband or as part of a carrier wave, which carries computer-readable program code. Such propagated data signals can take many forms, including but not limited to electromagnetic signals, optical signals, or any suitable combination thereof. Computer-readable signal media can also be any computer-readable medium other than computer-readable storage media, which can send, propagate, or transmit programs for use by or in conjunction with instruction execution systems, devices, or devices. The program code contained on the computer-readable medium can be transmitted using any suitable medium, including but not limited to: wires, optical cables, RF (radio frequency), etc., or any suitable combination thereof.

In some embodiments, the client and server may communicate using any currently known or future developed network protocol such as HTTP (Hypertext Transfer Protocol) and may be interconnected with any form or medium of digital data communication (e.g., a communication network). Examples of communication networks include local area networks ("LANs"), wide area networks ("WANs"), the Internet (e.g., the Internet), and end-to-end networks (e.g., ad hoc end-to-end networks), as well as any currently known or future developed networks.

The computer-readable medium can be included in the electronic device, or it can exist alone and not assembled into the electronic device.

The computer-readable medium carries one or more programs, and when the one or more programs are executed by the electronic device, the electronic device performs the method disclosed above.

Computer program code for performing the operations of the present disclosure may be written in one or more programming languages, or combinations thereof, including Object Oriented programming languages such as Java, Smalltalk, C++, and also conventional procedural programming languages such as "C" or similar programming languages. The program code may be executed entirely on the user's computer, partially on the user's computer, as a standalone software package, partially on the user's computer, or entirely on a remote computer or server. In the case of a remote computer, the remote computer may be connected to the user's computer via any type of network, including a local area network (LAN) or a wide area network (WAN), or may be connected to an external computer (e.g., via the Internet using an Internet service provider).

The flowcharts and block diagrams in the accompanying drawings illustrate the architecture, functions, and operations of systems, methods, and computer program products that may be implemented in accordance with various embodiments of the present disclosure. in this regard, each block in the flowchart or block diagram may represent a module, program segment, or portion of code that contains one or more executable instructions for implementing a specified logical function. It should also be noted that in some alternative implementations, the functions marked in the blocks may also occur in a different order than those marked in the figures. For example, two blocks represented in succession may actually be executed substantially in parallel, and they may sometimes be executed in the opposite order, depending on the function involved. It should also be noted that each block in the block diagram and/or flowchart, and combinations of blocks in the block diagram and/or flowchart, may be implemented using a dedicated hardware-based system that performs the specified function or operation, or may be implemented using a combination of dedicated hardware and computer instructions.

Described in the present embodiment relates to the disclosed unit may be implemented by way of software, may be implemented by way of hardware, wherein the name of the unit does not constitute a limitation on the unit itself in some cases.

The functions described above herein may be performed at least in part by one or more hardware logic components. For example, without limitation, exemplary types of hardware logic components that may be used include: field programmable gate arrays (FPGAs), application specific integrated circuits (ASICs), application specific standard products (ASSPs), system-on-chip (SOCs), complex programmable logic devices (CPLDs), and the like.

In the context of this disclosure, machine-readable media can be tangible media that can contain or store programs for use by or in conjunction with instruction execution systems, devices, or devices. Machine-readable media can be machine-readable signal media or machine-readable storage media. Machine-readable media can include, but are not limited to, electronic, magnetic, optical, electromagnetic, infrared, or semiconductor systems, devices, or devices, or any suitable combination thereof. More specific examples of machine-readable storage media may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to one or more embodiments of the present disclosure, there is provided an information processing method comprising:

creating a first processing item having a first online document in response to a first operation event;

triggering a processing flow of the first processing item in response to the second operation event.

According to one or more embodiments of the present disclosure, there is provided an information processing method, in response to a first operation event, before creating a first processing item, further comprising: in response to a flow creation operation, setting the service processing node of the processing flow and document permission of the handler of the service processing node.

According to one or more embodiments of the present disclosure, there is provided an information processing method, prior to creating a first processing item in response to a first operation event, further comprising: creating an item template for processing an item having a control for adding an online document in the item template;

the first processing item is established based on the item template.

According to one or more embodiments of the present disclosure, there is provided an information processing method, further comprising:

displaying the first processing item in a control of the target communication software of the handler of the node of the processing flow.

According to one or more embodiments of the present disclosure, there is provided an information processing method having a document display area for displaying the first online document in a display interface of the first processing item, the document display area, the size and/or position of the document display area is adjustable.

According to one or more embodiments of the present disclosure, there is provided an information processing method, the creator of the first processing item is the owner of the first online document, and after triggering the processing flow of the first processing item, ownership of the first online document is transferred from the creator of the first processing item to the first application; after the processing flow of the first processing item is completed, ownership of the first online document is returned to the creator of the first processing item.

According to one or more embodiments of the present disclosure, there is provided an information processing method in which, during execution of the processing flow, the permission to edit for the first online document is only opened to a handler with permission to edit in a current service processing node of the processing flow;

retrieving the document permission assigned to the handler of the service processing node after the end of the process flow.

According to one or more embodiments of the present disclosure, there is provided an information processing method, comprising: receiving a first document for use in a processing flow, wherein before receiving the first document, the author of the first document has a first right to the first document; after receiving the first document, changing the permission enjoyed by the author to the first document to a second permission, the second permission being different from the first permission.

According to one or more embodiments of the present disclosure, the first permission is a permission to read and permission to edit, the second permission is a permission to read.

According to one or more embodiments of the present disclosure, after receiving the first document, the processing node in the processing flow of the first document enjoys predetermined permission.

According to one or more embodiments of the present disclosure, when the first document is not through the processing flow or returned to the processing flow initiator, the author of the first document by the second permission for the first permission is changed.

According to one or more embodiments of the present disclosure, when a first handler in a node of the processing flow transfers the processing task to a further person, the further person has the same rights to the first document as the first handler has the same rights to the first document before the transfer.

According to one or more embodiments of the present disclosure, when a first handler in a node of the processing flow adds a task node to a further person, the further person and the first handler have the same rights to the first document.

According to one or more embodiments of the present disclosure, when the task node corresponding to the first handler in the node of the processing flow is deleted, the first handler's rights to the first document are withdrawn.

According to one or more embodiments of the present disclosure, when the processing flow proceeds from the current node to the next node, the first handler of the current node changes the permission of the first document from the first permission for the second permission, and the second handler of the next node changes the permission of the first document from the second permission for the first permission.

According to one or more embodiments of the present disclosure, when the processing flow returns from the current node to the previous node, the first handler of the previous node changes the permission of the first document from the second permission for the first permission, and the second handler of the current node changes the permission of the first document from the first permission for the second permission.

According to one or more embodiments of the present disclosure, further comprising: receiving comment content in the comment area of the first document, and the comment content is not associated with any person in the comment content, sending a notification message to the processing flow initiator and handler.

According to one or more embodiments of the present disclosure, further comprising: receiving comment content in the comment section of the first document, and the comment content in the comment content associated with the processing flow of the handler, sending a notification message to the processing flow initiator and the handler associated with the comment content.

According to one or more embodiments of the present disclosure, further comprising: receiving comment content in the comment area of the first document, the comment content in the comment content associated with a particular person, and the particular person when the first document is not entitled to limit, a reminder message is sent to remind whether to open the permission to read of the first document to the particular person.

According to one or more embodiments of the present disclosure, when determining the opening of the first document to the particular person readable permission, send a notification message to the particular person.

According to one or more embodiments of the present disclosure, there is provided an apparatus for information processing comprising: a document receiving module configured to receive a first document for processing flow, wherein, prior to receiving the first document, the author of the first document has a first right to the first document; permission change module configured to, after receiving the first document, the author of the first document has the right to change to a second permission, the second permission is different from the first permission.

According to one or more embodiments of the present disclosure, there is provided an information processing method, characterized by comprising:

prior to the processing request on a first file corresponding to a predetermined processing node, in response to a user operation, determining a first file target save address, so that the first file after the processing request is completed, is saved to the target save address.

According to one or more embodiments of the present disclosure, there is provided an information processing method comprising:

before the predetermined node, in response to a user operation, determining the target save address of the first file;

sending a processing request about the first file so that the processing request is processed;

wherein the target save address is the save address of the first file after the processing request is processed.

According to one or more embodiments of the present disclosure, the processing request includes address information of the target save address.

According to one or more embodiments of the present disclosure, if the first file is a document, the information processing method further comprises: displaying processing information corresponding to the processing request at a predetermined position within the document after the processing request is processed.

According to one or more embodiments of the present disclosure, the processing information includes link information, the link information is configured to be responsive to a user operation of the display process details information.

According to one or more embodiments of the present disclosure, the processing details information includes at least one of the following information: processing node information, handler information, processing opinion information, or processing time information.

According to one or more embodiments of the present disclosure, the information processing method further comprising: storing a file save directory in advance; the determining the target save address of the first file in response to a user operation comprises: in response to a user operation of the file save directory, determining the target save address of the first file.

According to one or more embodiments of the present disclosure, there is provided an information processing method, characterized by comprising:

a determining unit for, prior to processing a request for a first file corresponding to any node, in response to a user operation, determining a target address of the first file is saved, so that the first file after the processing request is completed, is saved to the target save address.

According to one or more embodiments of the present disclosure, there is provided an apparatus for information processing comprising:

a save address determination unit configured to determine the target save address of the first file in response to user operations before the predetermined node;

a request sending unit configured to send the processing request about the first file so that the processing request is processed;

wherein the target save address is the save address of the first file after the processing request is processed.

According to one or more embodiments of the present disclosure, if the first file is a document, the apparatus for information processing further comprising: a processing information display unit configured to process after the processing request is processed, the predetermined position within the document display processing information corresponding to the processing request.

According to one or more embodiments of the present disclosure, the apparatus for information processing further comprising: a directory storage unit for storing a file save directory in advance; in response to a user operation, determining the target save address of the first file, comprising: in response to a user operation of the file save directory, determining the target save address of the first file.

According to one or more embodiments of the present disclosure, there is provided a method of information processing, comprising: at a time before the end of a service processing flow about a first file, determining a save strategy for the first file in response to a user operation, so that the first file is saved based on the save strategy after the end of the service processing flow.

According to one or more embodiments of the present disclosure, the save strategy for the first file comprises at least one of: whether to save the first file, a target save address of the first file, and a save duration of the first file.

According to one or more embodiments of the present disclosure, the time before the end of the service processing flow comprises at least one of: before the creation of the service processing flow, during a creation process, or during a processing process.

According to one or more embodiments of the present disclosure, the user comprises a creator of the service processing flow or a user with a predetermined management permission.

According to one or more embodiments of the present disclosure, at a time before the end of a service processing flow about a first file, determining a save strategy for the first file in response to a user operation comprises: before the creation of the service processing flow, in response to a user operation with a predetermined management permission, determining a target save address or a predetermined save address range of the first file.

According to one or more embodiments of the present disclosure, at a time before the end of a service processing flow about a first file, determining a save strategy for the first file in response to a user operation comprises: during the creation process of the service flow, determining a target save address of the first file based on an address determined by a creator of the service processing flow from a predetermined save address range.

According to one or more embodiments of the present disclosure, if the time before the end of the service processing flow is during the creation process of the service processing flow, the method further comprising: in response to a user operation, initiating the service processing flow, so that the service processing flow is executed with a predetermined processing.

According to one or more embodiments of the present disclosure provides a method of information processing, further comprising: during the processing process of the service processing flow, displaying the save strategy in a display interface corresponding to the service processing flow.

According to one or more embodiments of the present disclosure, determining a save strategy for the first file in response to a user operation comprises: displaying a target save address input interface, and determining a target save address in response to a user input operation.

According to one or more embodiments of the present disclosure, determining a save strategy for the first file in response to a user operation comprises: displaying a file save directory corresponding to a server; in response to a user operation on the file save directory, determining a target save address of the first file.

The method of information processing according to one or more embodiments of the present disclosure, further comprising: pre-establishing an association relationship between a server and an application for processing the service processing flow, so that the first file is capable of being saved in the server based on a target save address determined by a user operation.

According to one or more embodiments of the present disclosure, the pre-establishing an association relationship between a server and an application for processing the service processing flow comprises: pre-determining a first interface corresponding to the server in the application; the first interface is configured to be able to display a file save directory of the server in the application, and save the first file to the server based on a target save address determined by a user from the file save directory.

According to one or more embodiments of the present disclosure provides a method of information processing, further comprising: during the processing process of the service processing flow, modifying the save strategy in response to a user operation.

According to one or more embodiments of the present disclosure provides a method of information processing, further comprising: during the processing process of the service processing flow, loading the first file in response to a user operation.

According to one or more embodiments of the present disclosure provides a method of information processing, further comprising: after the end of the service processing flow, saving the first file based on the save strategy.

According to one or more embodiments of the present disclosure, the first file is an online file; a target save address is in a server.

According to one or more embodiments of the present disclosure, the service processing flow comprises an approval flow, or a reporting flow, or a project management flow.

According to one or more embodiments of the present disclosure provides a method of information processing, further comprising: converting the first file into an online file or adding the first file to an online file; after the end of the service processing flow, saving the online file to a server based on the save strategy.

According to one or more embodiments of the present disclosure, there is provided a method of information processing, comprising: determining a second file associated with a first application, the second file comprising a non-online file; illustratively, the second file includes a first application attachment; converting the second file into a first online file or adding the second file to the first online file; determining a file save strategy associated with the first application, the file save strategy comprising online save address information; saving the first online file to an online save address indicated by the file save strategy.

The method of information processing according to one or more embodiments of the present disclosure, further comprising: pre-establishing an association relationship between the first application and an online file storage server, so that an archive directory interface of the online file storage server is able to be invoked by the first application, and determining the online save address information by the archive directory interface.

According to one or more embodiments of the present disclosure provides a method of information processing, further comprising: generating the first online file based on information of the first application.

Illustratively, a new online file may be generated based on the name of the first application, identification, etc., for carrying the attachment of the first application.

In some embodiments, generating a first online file according to the information of the first application program includes: displaying link information of the first application at a predetermined position of the first online file, the link information being configured to jump to the first application.

According to one or more embodiments of the present disclosure, there is provided an apparatus for information processing, comprising: a determination unit configured for, at a time before the end of a service processing flow about a first file, determining a save strategy for the first file in response to a user operation, so that the first file is saved based on the save strategy after the end of the service processing flow.

According to one or more embodiments of the present disclosure, there is provided an electronic device comprising:

at least one memory and at least one processor;

wherein the memory for storing program code, the processor for calling the program code stored in the memory to cause the electronic device to perform a method of providing information processing according to one or more embodiments of the present disclosure.

According to one or more embodiments of the present disclosure, there is provided a non-transitory computer storage medium, the non-transitory computer storage medium stores program code, the program code is executed by a computer device, so that the computer device performs a method of providing information processing according to one or more embodiments of the present disclosure.

The above description is only the preferred embodiment of the present disclosure and an explanation of the technical principles used. Those skilled in the art should understand that the scope of the disclosure involved in this disclosure is not limited to the specific combination of the technical features of the above technical solutions, but should also cover other technical solutions formed by any combination of the above technical features or equivalent features without departing from the above disclosure concept. For example, the technical solutions formed by replacing the above features with (but not limited to) technical features with similar functions disclosed in this disclosure.

In addition, although the operations are depicted in a specific order, this should not be understood as requiring these operations to be performed in the specific order shown or in sequential order. Under certain circumstances, multitasking and parallel processing may be advantageous. Similarly, although several specific implementation details are included in the above discussion, these should not be construed as limiting the scope of the present disclosure. Certain features described in the context of individual embodiments may also be implemented in combination in a single embodiment. Conversely, various features described in the context of a single embodiment may also be implemented in multiple embodiments individually or in any suitable subcombination.

Although the subject matter has been described in language specific to structural features and/or methodological logical acts, it should be understood that the subject matter defined in the appended claims is not necessarily limited to the particular features or acts described above. Rather, the particular features and acts described above are merely exemplary forms of implementation of the claims.

We claim:

1. A method of improving file processing efficiency, comprising:

pre-establishing an association relationship between a server and an application, wherein the application is configured to create and execute service flows about files, and wherein the server comprises a cloud file storage center;

displaying a first interface corresponding to the server in the application, wherein the first interface is configured to display an archive directory of the cloud file storage center in the application, and wherein the first interface is further configured to archive the files to the cloud file storage center;

during creating a service flow of approving a first file, determining a save strategy in response to a user operation received via the first interface, wherein the service flow of approving the first file is created using the application, wherein the save strategy comprises whether to save the first file, a target save address of archiving the first file, and a save duration of archiving the first file, and wherein the determining the save strategy comprises in response to the user operation with a predetermined management permission, determining the target save address or a predetermined save address range of the first file;

automatically generating approval-related information during executing the service flow;

displaying the approval-related information at a predetermined position in the first file; and automatically archiving the first file and the approval-related information into the cloud file storage center based on the save strategy in response to determining that the service flow is completed.

2. The method of information processing of claim 1, wherein, the user comprises a creator of the service processing flow or a user with a predetermined management permission.

3. The method of information processing of claim 1, wherein the method further comprises:

during the creation process of the service flow, determining a target save address of the first file based on an address determined by a creator of the service processing flow from a predetermined save address range.

4. The method of information processing of claim 1, further comprising:

in response to a user operation, initiating the service processing flow so that the service processing flow is executed with a predetermined processing.

5. The method of information processing of claim 1, further comprising:

during processing the service flow, displaying the save strategy in a display interface corresponding to the service flow.

6. The method of information processing of claim 1, wherein determining a save strategy for the first file in response to a user operation comprises:

displaying a target save address input interface, and determining a target save address in response to a user input operation.

7. The method of information processing of claim 1, wherein determining a save strategy for the first file in response to a user operation comprises:

displaying a file save directory corresponding to a server; and in response to a user operation on the file save directory, determining a target save address of the first file.

8. The method of information processing of claim 1, further comprising:

during processing the service flow, modifying the save strategy in response to a user operation.

9. The method of information processing of claim 1, further comprising:

during processing the service flow, loading the first file in response to a user operation.

10. A method of improving file processing efficiency, comprising:

pre-establishing an association relationship between a first application and an online file storage server by pre-establishing a first interface, wherein the first application is configured to create and execute service flows about files, wherein the online file storage server comprises a cloud file storage center, and wherein the first interface is configured to archive the files to the online file storage server;

determining a second file associated with the first application, the second file comprising a non-online file;

converting the second file into a first online file or adding the second file to the first online file;

determining, in response to receiving user input via the first interface, a file save strategy associated with the first application during creating a service flow of approving the first online file, wherein the file save strategy comprises whether to save the first online file, a target save address of archiving the first online file, and a save duration of archiving the first online file, and wherein the determining the file save strategy comprises in response to a user operation with a predetermined management permission, determining the target save address or a predetermined save address range of the first online file;

automatically generating approval-related information during executing the service flow;

displaying the approval-related information at a predetermined position in the first online file; and automatically archiving the first online file and the approval-related information to the cloud file storage center based on the file save strategy in response to determining that the service flow is completed.

11. The method of claim 10, further comprising:

generating the first online file based on information of the first application.

12. The method of claim 11, wherein generating the first online file based on information of the first application comprises:

displaying link information of the first application at a predetermined position of the first online file, the link information being configured to jump to the first application.

13. An electronic device, comprising:

at least one memory and at least one processor; wherein the memory is configured to store program code, and the processor is configured to call the program code stored in the memory to cause the electronic device to perform acts of information processing, wherein the acts comprise:

pre-establishing an association relationship between a server and an application, wherein the application is configured to create and execute service flows about files, and wherein the server comprises a cloud file storage center, displaying a first interface corresponding to the server in the application, wherein the first interface is configured to display an archive directory of the cloud file storage center in the application, and wherein the first interface is further configured to archive the files to the cloud file storage center, during creating a service flow of approving a first file, determining a save strategy in response to a user operation received via the first interface, wherein the service flow of approving the first file is created using the application, wherein the save strategy comprises whether to save the first file, a target save address of archiving the first file, and a save duration of archiving the first file, and wherein the determining the save strategy comprises in response to the user operation with a predetermined management permission, determining the target save address or a predetermined save address range of the first file, automatically generating approval-related information during executing the service flow, displaying the approval-related information at a predetermined position in the first file; and automatically archiving the first file and the approval-related information into the cloud file storage center based on the save strategy in response to determining that the service flow is completed;

or, wherein the acts comprise:

pre-establishing an association relationship between a first application and an online file storage server by pre-establishing a first interface, wherein the first application is configured to create and execute service flows about files, wherein the online file storage server comprises a cloud file storage center, and wherein the first interface is configured to archive the files to the online file storage server, determining a second file associated with the first application, the second file comprising a non-online file, converting the second file into a first online file or adding the second file to the first online file, determining, in response to receiving user input via the first interface, a file save strategy associated with the first application during creating a service flow of approving the first online file, wherein the file save strategy comprises whether to save the first online file, a target save address of archiving the first online file, and a save duration of archiving the first online file, and wherein the determining the file save strategy comprises in response to a user operation with a predetermined management permission, determining the target save address or a predetermined save address range of the first online file, automatically generating approval-related information during executing the service flow, displaying the approval-related information at a predetermined position in the first online file, and automatically archiving the first online file and the approval-related information to the cloud file storage center based on the file save strategy in response to determining that the service flow is completed.

14. A non-transitory computer storage medium, wherein the non-transitory computer storage medium stores program code that, when executed by a computer device, causes the computer device to perform acts of information processing, wherein the acts comprise:

pre-establishing an association relationship between a server and an application, wherein the application is configured to create and execute service flows about files, and wherein the server comprises a cloud file storage center, displaying a first interface corresponding to the server in the application, wherein the first interface is configured to display an archive directory of the cloud file storage center in the application, and wherein the first interface is further configured to archive the files to the cloud file storage center, during creating a service flow of approving a first file, determining a save strategy in response to a user operation received via the first interface, wherein the service flow of approving the first file is created using the application, wherein the save strategy comprises whether to save the first file, a target save address of archiving the first file, and a save duration of archiving the first file, and wherein the determining the save strategy comprises in response to the user operation with a predetermined management permission, determining the target save address or a predetermined save address range of the first file, automatically generating approval-related information during executing the service flow, displaying the approval-related information at a predetermined position in the first file; and automatically archiving the first file and the approval-related information into the cloud file storage center based on the save strategy in response to determining that the service flow is completed;

or, wherein the acts comprise:

pre-establishing an association relationship between a first application and an online file storage server by pre-establishing a first interface, wherein the first application is configured to create and execute service flows about files, wherein the online file storage server comprises a cloud file storage center, and wherein the first interface is configured to archive the files to the online file storage server, determining a second file associated with the first application, the second file comprising a non-online file, converting the second file into a first online file or adding the second file to the first online file, determining, in response to receiving user input via the first interface, a file save strategy associated with the first application during creating a service flow of approving the first online file, wherein the file save strategy comprises whether to save the first online file, a target save address of archiving the first online file, and a save duration of archiving the first online file, and wherein the determining the file save strategy comprises in response to a user operation with a predetermined management permission, determining the target save address or a predetermined save address range of the first online file, automatically generating approval-related information during executing the service flow, displaying the approval-related information at a predetermined position in the first online file, and automatically archiving the first online file and the approval-related information to the cloud file storage center based on the file save strategy in response to determining that the service flow is completed.

* * * * *